United States Patent [19]
Mann et al.

[11] Patent Number: 6,119,096
[45] Date of Patent: Sep. 12, 2000

[54] SYSTEM AND METHOD FOR AIRCRAFT PASSENGER CHECK-IN AND BOARDING USING IRIS RECOGNITION

[75] Inventors: Stewart Mann; L. Maribel Mann, both of Falls Church, Va.

[73] Assignee: EyeTicket Corporation, McLean, Va.

[21] Appl. No.: 09/053,216

[22] Filed: Apr. 1, 1998

Related U.S. Application Data

[60] Provisional application No. 60/070,566, Jan. 6, 1998, and provisional application No. 60/054,339, Jul. 31, 1997.

[51] Int. Cl.[7] ........................................ G06F 17/60
[52] U.S. Cl. ....................... 705/5; 382/117; 235/384; 705/40
[58] Field of Search ....................... 705/35, 5, 40, 705/41, 42, 43, 44, 26, 27; 235/380, 384; 382/115, 116, 117, 118, 119, 124; 707/3, 4, 5, 6, 7, 9, 10

[56] References Cited

U.S. PATENT DOCUMENTS

| | | | |
|---|---|---|---|
| 4,210,899 | 7/1980 | Swonger et al. | 382/117 |
| 4,641,349 | 2/1987 | Flom et al. | 382/125 |
| 4,711,994 | 12/1987 | Greenberg | 235/384 |
| 4,798,942 | 1/1989 | Aubrey | 235/384 |
| 5,051,565 | 9/1991 | Wolfram | 235/384 |
| 5,053,608 | 10/1991 | Senanayake | 235/380 |
| 5,177,342 | 1/1993 | Adams | 235/379 |
| 5,225,990 | 7/1993 | Bunce et al. | 700/226 |
| 5,229,764 | 7/1993 | Matchett et al. | 340/825.34 |
| 5,280,527 | 1/1994 | Gullman et al. | 713/184 |
| 5,291,560 | 3/1994 | Daugman | 382/117 |
| 5,336,870 | 8/1994 | Hughes et al. | 235/379 |
| 5,469,506 | 11/1995 | Berson | 713/186 |
| 5,471,203 | 11/1995 | Sasaki et al. | 340/825.31 |
| 5,478,993 | 12/1995 | Derkson | 235/380 |
| 5,485,520 | 1/1996 | Chaum et al. | 705/74 |
| 5,497,430 | 3/1996 | Sadovnik et al. | 382/156 |
| 5,566,327 | 10/1996 | Sehr | 707/104 |
| 5,572,596 | 11/1996 | Wildes et al. | 382/117 |
| 5,578,808 | 11/1996 | Taylor | 235/380 |
| 5,594,806 | 1/1997 | Colbert | 382/115 |
| 5,613,012 | 3/1997 | Hoffman et al. | 382/115 |
| 5,615,277 | 3/1997 | Hoffman | 382/115 |
| 5,712,914 | 1/1998 | Aucsmith et al. | 380/30 |
| 5,764,789 | 6/1998 | Pare, Jr. et al. | 392/115 |
| 5,793,639 | 8/1998 | Yamazaki | 700/226 |
| 5,801,367 | 9/1998 | Asplund et al. | 235/384 |
| 5,809,480 | 9/1998 | Chasek | 705/13 |
| 5,845,692 | 12/1998 | Kellem et al. | 160/118 |
| 5,866,888 | 2/1999 | Bravman et al. | 235/375 |
| 5,877,484 | 3/1999 | Hirose | 235/382 |
| 5,901,238 | 5/1999 | Matsushita | 382/117 |

(List continued on next page.)

FOREIGN PATENT DOCUMENTS

| 0271022 | 6/1988 | European Pat. Off. . |
|---|---|---|
| 04063785 | 10/1993 | Japan . |

OTHER PUBLICATIONS

Anonymous, "Smart cards promise multiple travel benefits", Jane's Airport Review, pp. 35, Mar. 1, 1996.

(List continued on next page.)

*Primary Examiner*—Emanuel Todd Voeltz
*Assistant Examiner*—Alexander Kalinowski
*Attorney, Agent, or Firm*—Evan R. Smith

[57] ABSTRACT

A system and method for automated aircraft boarding uses an iris recognition system for check-in and boarding. The passenger is enrolled once and assigned an account number. The passenger thereafter makes reservations using that account number. On arrival at the airport, the passenger is identified using an iris recognition system and automatically checked in for the flight, without the use of cards or other identification. Entry to the aircraft at the gate may also be provided with an iris recognition station. In one preferred embodiment, baggage check and baggage reconciliation are also performed using iris recognition. In its preferred embodiment, the disclosed system and method enhances customer convenience by eliminating tickets, boarding passes, and identification steps, while improving aircraft security.

67 Claims, 11 Drawing Sheets

U.S. PATENT DOCUMENTS

| | | | |
|---|---|---|---|
| 5,912,981 | 6/1999 | Hansmire et al. | 382/116 |
| 5,920,053 | 7/1999 | DeBrouse | 235/375 |
| 5,930,761 | 7/1999 | O'Toole | 705/5 |
| 5,943,651 | 8/1999 | Oosawa | 705/5 |
| 5,953,440 | 9/1999 | Zhang et al. | 705/5 |
| 5,953,705 | 9/1999 | Oneda | 382/117 |
| 5,956,122 | 9/1999 | Doster | 351/210 |
| 5,978,494 | 11/1999 | Zhang | 382/117 |
| 5,991,429 | 11/1999 | Coffin et al. | 382/118 |

OTHER PUBLICATIONS

Torbenson, Eric, "Northwest Airlines to Upgrade Computers, Offer Self–Service Check–In," Knight Ridder Tribune Business News, Jul. 31, 1999.

Torbenson, Eric, "Airlines to Offer Faster Services to Attract Passengers," Knight–Ridder Tribune Business News, Jul. 31, 1999.

Hildreth, Elizabeth, "A Smart Biometric Answer for Airline Safety," Card Technology, Oct. 1, 1999, p. 27+, Faulkner & Gray, Inc.

"SITA at 50," Air Transport World, Jun. 1999, p. 51+, vol. 36 No. 6, Penton Publishing, Inc.

Broderick, Sean, "IATA, IBM to Offer Easy Link for E–Ticket Systems," Inside IT, Aug. 25, 1999, p. 1, vol. 1 No. 8, McGraw–Hill Companies, Inc.

Strassberg, Dan, "Biometrics: You are Your Password," EDN, May 7, 1998, p. 46(8), vol. 43 No. 10, Cahners Publishing Co.

"A Casual Look by Commuters May Mean the End of Tokens, Tickets Passes and Cash in Mass Transit," PR Newswire, Mar. 28, 1998, Spring Technologies, Inc.

Butterworth–Hayes, Philip, The Pitfalls and Promises of Self–Service Check–In Kiosks, Jane's Airport Review, Jan. 1, 1999, p. 46, vol. 11 No. 1.

"Facing Up to Biometrics: New report shows how Biometric Technologies will Change People's Lives," PR Newswire, Aug. 5, 1998, London, UK.

"The Eyes Have It," Electronic Payments International, Jan. 1998, p. 13, No. 126, Lafferty Publications Ltd.

Arnst, Catherine "Face to Face with the Latest in Airport Security," Jun. 2, 1997, Business Week, p. 130E, No. 3529, Mcgraw–Hill Companies, Inc.

McRae, Hamesh, "Business (A traveller's cheque for the future)," Independent on Sunday, Aug. 3, 1997.

"Airport Feature—The Intelligent Airport," Jane's Airport Review, May 1, 1996, p. 51, vol. 8 No. 4, Jane's Information Group.

Zutell, Irene, "Newark News: With Twice as much Space and Services, Newark's International Terminal Simplifies Transfers for Travelers," Travel Agent, Apr. 22, 1996, p. 26, Gale Group.

Churchill, David, "The Airlines' First Priorities (international business travelers)," Management Today, Oct. 1995, p. 90(4), Management Publications Ltd., UK.

"CDSI Unveils Biometric Smart Card System, Boosting Airport, Airline Security," PR Newswire, Aug. 17, 1995, p. 817DC017, Computer Data Systems, Inc., Rockville, Maryland.

Glauberman, Stu, "Proposed Airport Service would Speed up Arrivals," Honolulu Advertiser, Apr. 1, 1995, p. C–1.

Bredemeier, Judi, "Traveler or Terrorist?: High–Tech Passenger Profiling May Aid Airport Security," Business Travel News, Mar. 23, 1992, p. 1, Miller Freeman, Inc.

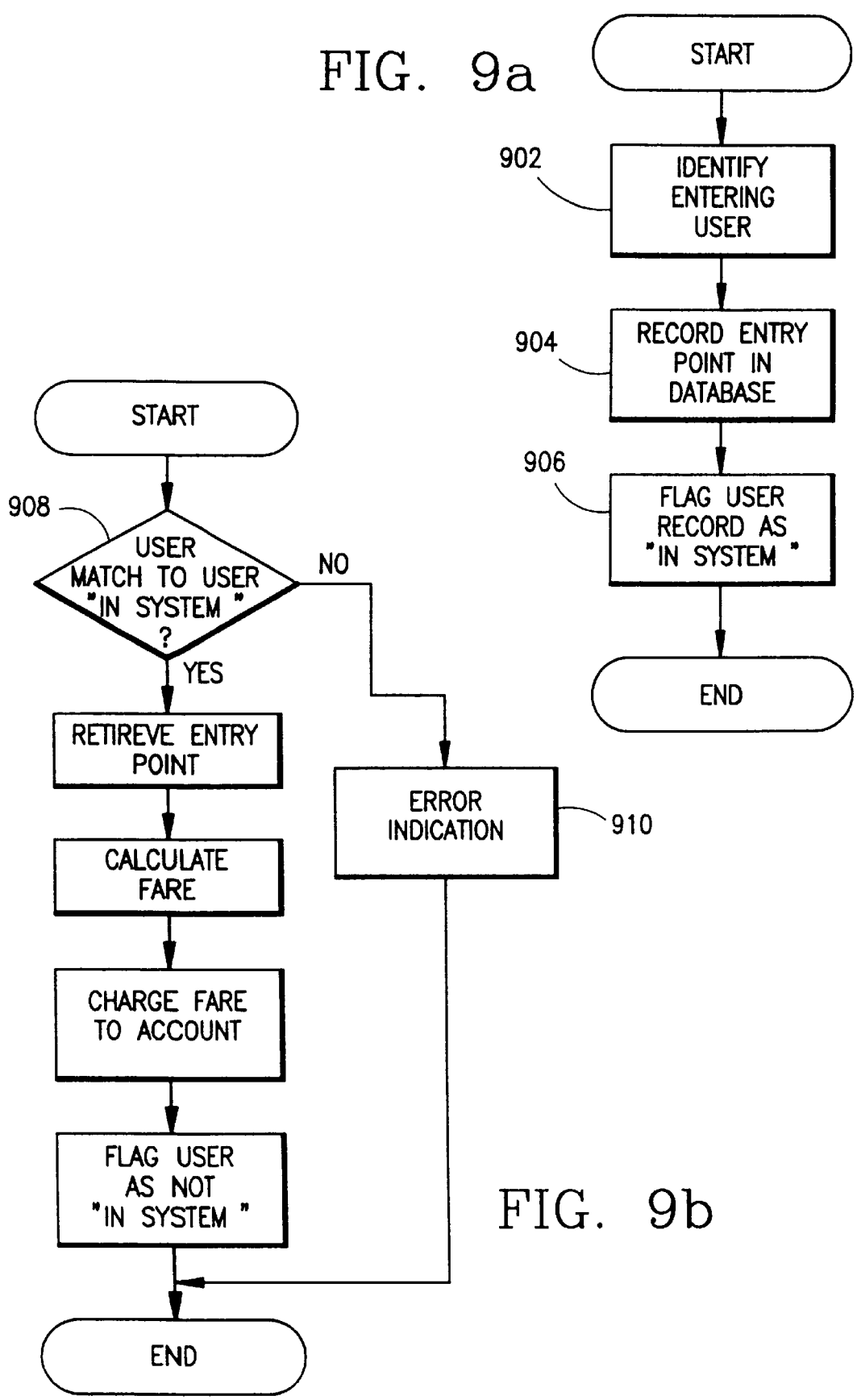

SYSTEM AND METHOD FOR AIRCRAFT PASSENGER CHECK-IN AND BOARDING USING IRIS RECOGNITION

This application claims the benefit of the following U.S. Provisional Patent Applications: Ser. No. 60/070,566, filed Jan. 6, 1998, and Ser. No. 60/054,339, filed Jul. 31, 1997.

FIELD OF THE INVENTION

The present invention relates generally to a financial transaction system and method for providing debit or credit/charge functions and enabling ingress/egress to halls, stadiums, public mass transit networks, and the like using biometric identification procedures.

BACKGROUND OF THE INVENTION

Public transit systems have long accepted cash or metal tokens, sometimes received by unattended mechanical turnstiles, to control entry into the system. Increasingly, such transit systems are using machine-readable tickets or "farecards" encoded with a fare balance, which is debited by the appropriate fare as the user enters and/or exits the transit system.

The farecards have several advantages over metal tokens. They are lighter in weight, difficult to forge, can be used by the traveler for a large number of trips without replenishment, and make it possible to increase revenue and fairly allocate costs by dynamically varying the charge for a trip, based on distance traveled, peak/off peak travel times, etc. However, farecards are still "tokens" in the sense that they are a physical artifact that must be carried by the transit user to access the system. Further, these tickets typically wear out rapidly and it is a challenge to provide these tickets in a form that is durable enough to withstand normal use, yet not prohibitively expensive. Thus, for several reasons it would be desirable if artifacts such as farecards and tokens could be substantially eliminated from the process of controlling access to the transit system.

Airlines similarly depend on tickets to determine who will be allowed to board an aircraft. Unauthorized resale of tickets and security concerns about allowing unidentified persons on board an aircraft has recently led the Federal Aviation Administration, and airlines, to require that passengers show identification when checking in, in addition to a ticket.

Access to sporting and cultural events held in stadiums, concert halls, and the like is normally obtained by purchasing a ticket which is then shown to obtain admission. Reliance on a ticket "artifact" as the sole arbiter of admission leads to an aftermarket for tickets, which may pass through many hands before they reach a person who actually wishes to attend the event. Although ticket "scalping" is illegal in many jurisdictions, popular events often sell out quickly. Scalpers create an artificial scarcity by purchasing all the available tickets with the intent of reselling them. Thus, persons with an actual interest in attending an event may have no alternative to purchasing tickets from a reseller of unknown reputation, and at an inflated price.

To the extent the ticket resellers create an artificial scarcity of tickets by hoarding ticket inventory, it would be desirable to prevent this practice. To the extent that ticket resellers provide a useful economic service by ensuring that tickets are allocated to their highest valuing user, it would be desirable to provide event organizers with a mechanism to recoup a fair share of the additional value attaching to the tickets after they leave the box office, since it is the demand for the performance that generates this excess value, and not necessarily the ticket resellers.

With widespread availability of high quality color copiers, another ticket-related problem is introduced. There is a great danger that a ticket bought from a party other than the official box office or authorized ticketing agency will be a forgery. Recently, in professional football stadiums, persons arriving for a game have discovered that numerous other people have tickets for the same seats, due to sales of multiple ticket copies by forgers.

Previous efforts to develop effective systems for controlling access to transportation and financial accounts have not provided a solution for these problems. U.S. Pat. No. 5,485,520 to Chaum et al. shows a system that collects highway tolls from moving vehicles without requiring them to stop. This is accomplished, however, by using an in-vehicle transmitting unit (an artifact) to identify the vehicle, then billing the user's credit card or other account for tolls incurred.

Other prior systems use biometrics to provide identification for secured access to areas and financial transactions. For example, U.S. Pat. Nos. 5,615,277 and 5,613,012 to Hoffman et al. control access to computer systems and financial accounts using biometric identification procedures. U.S. Pat. No. 5,572,596 to Wildes et al., U.S. Pat. No. 5,280,527 to Gullman et al., U.S. Pat. No. 5,177,342 to Adams, U.S. Pat. No. 5,336,870 to Hughes, U.S. Pat. No. 5,471,203 to Sasaki, and U.S. Pat. No. 4,210,899 to Swonger et al. similarly show systems using biometrics for identification purposes. However, none of these prior systems provide an access control and billing system that is particularly adapted to operate in a transit and event environment.

The transit access and ticketing issues noted above have traditionally been viewed as separate problems. There has been no effective system in either realm which would allow a person to register at the time of a ticket or fare purchase, and then obtain later delivery of the purchased service (e.g. access to a transit system or entry to an event) without carrying an artifact. Thus, the inventor believes there is a need for an improved system and method for registration and delivery of these transportation and event access services.

SUMMARY OF THE INVENTION

Therefore, it is a general object of the present invention to provide an improved biometric access control and user billing system for events, tourist attractions, and transit systems.

Another object of the invention is to provide an improved access control and user billing mechanism which uses biometric identification techniques to eliminate the need to carry artifacts or remember identifying numbers.

Another important object of the invention is to provide an improved biometric ticketless identification system which facilitates making airline reservations, checking in, and boarding of aircraft and provides enhanced verification and enhanced security features.

A further object of the invention is to provide a system and method for controlling ingress to fee-for-access areas by charging the accounts of registered users based on a tokenless biometric identification at an entry point to the area.

Another object of the invention is to provide an improved system and method for expediting fare collection in a mass transit system using coordinated biometric identification of preregistered users at both ingress and egress points to determine variable fares to be charged to user accounts.

A further object of the invention is to provide improved systems and methods for acquiring an iris image in a high volume turnstile-type application with minimal effort by users to position their eyes for scanning.

Another object of the invention is to provide a system and method for biometrically associating reservations or tickets with a party, and transferring the reservations or tickets to another party, while collecting a transfer fee for this service.

An additional object of the invention is to provide a system and method for charging access or user fees based on biometric identification of an anonymous user holding a deposit account.

Another object of the invention is to provide an improved biometric identification system suitable for high volume, general public use which selectively uses an electronic camera array to acquire an image of an iris or other identifying feature.

It is also an object of the invention to provide a system and method for providing a network of biometric identification and billing systems to facilitate intermodal access by registered users to geographically diverse transportation systems, arenas, etc.

Another object of the invention is to provide a biometric identification and billing system to collect usage or access fees from users which stores account codes for users, the presence or absence of specific codes causing special operations of the system different from other operations.

Yet another object of the invention is to provide a system for charging user accounts for access to areas or systems, based on biometric identification of the user.

A further object of the invention is to provide a system for charging user accounts for access to areas or systems, based on biometric identification of the user, which also provides point-of-purchase scanners within the defined area or system, for charging goods or services to the user account.

A more specific object of the invention is to provide an improved system and method for expediting fare collection in a mass transit system using biometric identification of preregistered users with automated account charging.

Another object of the invention is to provide a biometric access control and accounting system which is electronically connected to a financial network to facilitate charging users for ingress and/or egress to areas or systems.

Additional objects of the invention will be apparent to those skilled in the art upon examination of the specification, including the drawings and claims.

These objects and others are achieved by providing an integrated access control and accounting system which identifies registered users by scanning a stable biometric characteristic as the user passes through a checkpoint. An account associated with the user is then debited by a ticket charge, usage fee, fare, or other charge appropriate to the site or conveyance accessed through the system. In various preferred embodiments, the system is connected to a financial network for processing of charges, and point of purchase stations are provided within the controlled area so that registered users may charge goods and services to their accounts without carrying cash or other artifacts.

BRIEF DESCRIPTION OF THE DRAWINGS

FIGS. 9a and 9b are flow charts showing entry and exit processing in a system that varies charges depending on the point of entry or exit;

DETAILED DESCRIPTION OF THE PREFERRED EMBODIMENTS

The present invention relates generally to a integrated financial transaction system and method for providing debit or credit/charge functions and enabling ingress/egress to halls, stadiums, public mass transit networks, and the like using biometric identification procedures. The systems and methods of the invention will be described in terms of operation in exemplary applications, such as mass transit and sporting event arena access. However, it should be recognized that the systems and methods disclosed may be applied with minor modifications to a variety of locations where it is advantageous to provide an ingress/egress control system closely coupled with an accounting function, including movie theaters, theme or amusement parks, concert halls, museums, etc.

These applications fall into several categories: (1) applications where a generally unlimited number of admissions to the same area are possible (e.g. theme parks, museums, and mass transit systems); (2) applications where a limited number of admissions are possible and those admitted have an assigned seat, so that the system of the present invention must incorporate an operationally coupled prior reservation, registration, and seating assignment system (e.g. airlines, stadiums, concert halls); and (3) hybrid applications where the number of admissions must be controlled within a defined limit, but reservations and seat assignments are not required (e.g. movie theaters). Examples of implementations of the invention in each of these categories will be described below. Those skilled in the art will appreciate that the examples given can be readily adapted, in each case, to venues having similar operational characteristics.

Figure 1A:
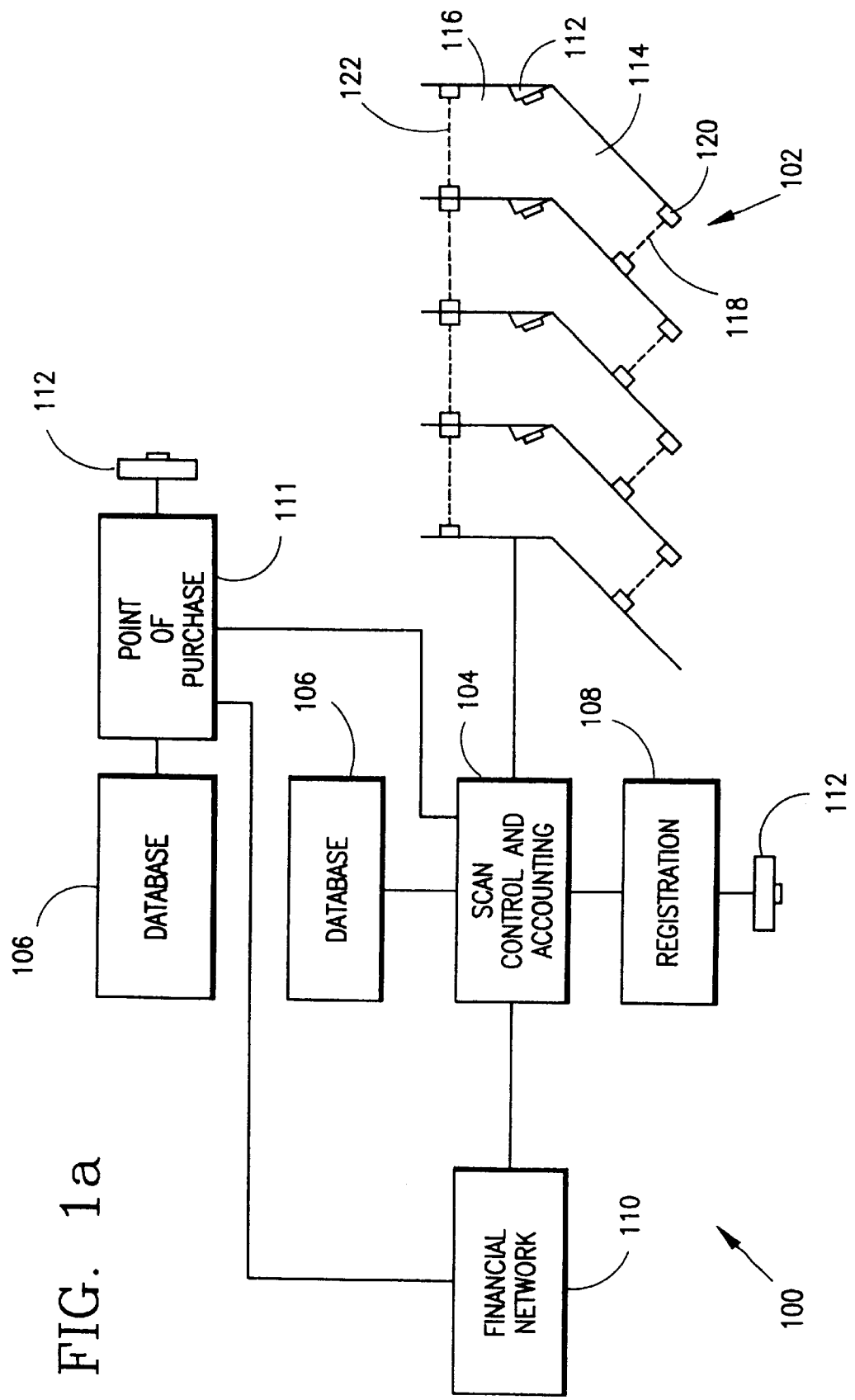
FIG. 1a is a block schematic diagram showing an access control and accounting system according to the present invention.

The invention will be described initially with reference first to FIG. 1a. As shown in FIG. 1a, system 100 includes one or more turnstiles 102, operably connected to scan control and accounting computer 104, which is connected to database 106, one or more registration stations 108, and optionally to financial network 110.

Registration station 108 includes a biometric sensor 112 which captures real time data corresponding to a stable physical characteristic of a person such as a fingerprint, palm print, full facial image, features of the iris of the eye, eye retinal pattern, body thermal image, or DNA pattern. In a preferred embodiment, biometric sensor 112 scans the iris of the eye and records its features for recall and comparison. Biometric sensor 112, registration station 108, and scan control and accounting computer 104 are preferably constructed to incorporate a System 2100 host processor/central enrollment unit sold by IriScan, Inc. of Mt. Laurel, N.J., as well as associated software for searching the database and matching iris images, also available from IriScan, Inc. Operational principles for iris recognition software are disclosed in U.S. Pat. No. 5,291,560 to Dr. John Daugman and other issued and pending patents assigned to IriScan, Inc.

Financial network 110 provides a data link to a financial institution and/or credit transaction processing center to permit the scan control and accounting computer 104 to process credit transactions, verify creditworthiness, and transmit requests to debit accounts at the financial institution. The data link may be used to process payments for each purchase using system 100, or to create a credit balance with the system 100, recorded in scan control and accounting computer 104, which can be drawn against by a user having an account containing the credit balance.

Database 106 stores the biometric data collected by biometric sensor 112 at registration station 108 for each user, in conjunction with information about the services purchased by that user. For example, in a typical mass transit access control system according to the invention, each rider would have identifying biometric information stored in database 106, along with an account balance equivalent to a farecard balance. Typically this account balance would be established by debiting the user's bank account or credit card by a predetermined amount, such as $30, using the connection to financial network 110. In a typical arena or hall ticketing system according to the invention, each patron, or a single representative of each patron group who purchased the tickets, would have identifying biometric information collected and stored. The patron's record would also identify the event or events for which tickets were purchased, and particular assigned seating for the event(s).

In each of these two examples, when the user or patron wishes to attend the event or use the transit system or the like, the user or patron will enter one of the turnstiles 102 and submit to a biometric scan. The biometric scanners in turnstiles 102 will capture a real time stable physical characteristic image (such as an iris pattern) directly from a person; encode the image; and compare the encoded image to stored physical characteristic data in database 106. If the captured image is not recognized as corresponding to any of the stored data access is denied and the user or patron is directed to seek assistance from onsite personnel, or through an intercom or video conference system. Although the system is described herein in terms of the iris scanning embodiment, the biometric sensors used may rely on any stable physical characteristic or on a combination of such characteristics for identification purposes. What is important is that the characteristic or characteristics chosen be capable of uniquely identifying an individual as the authorized individual who purchased the seats or transit access, within an acceptable margin of error.

One or more point of purchase scanning computers 111, with associated biometric scanners 112, may be connected to scan control and accounting computer 104 so that users within the transit system, hall, arena, etc. may obtain goods and services by submitting to a further biometric scan at the point of purchase. Such points of purchase may include newsstands, concessions, retail stores, and various services provided within the fee-for-access area accessed through turnstiles 102. Goods and services purchased in this manner result in debits to user accounts which are accomplished according to any of the methods described herein. Point of purchase scanning computer 111 may optionally be provided with a copy of database 106 and with software for real-time matching of a biometric scan from scanner 112 with a corresponding user record from database 106. This software may be identical to that provided in scan control and accounting computer 104. In this embodiment, point of purchase scan computer 111 performs user identification independently of the operation of scan control and accounting computer 104, and when identification is complete, may either directly initiate a charge to one of user's financial accounts using financial network 110 (to which point of purchase scanning computer 110 is connected), or may pass one or more information packets to scan control and accounting computer 104 specifying the user account, purchase amount, and information about the purchase, so that scan control and accounting computer 110 may debit the user account or accounts in a predetermined manner as will be described in more detail below.

If point of purchase scanning computer 111 is provided with a standalone copy of database 106 containing user account and biometric data, this database copy may be continually updated in real time, or may be updated periodically (e.g. once a day during the early morning hours) from the master registration database associated with scan control and accounting computer 104. For simplicity, only one turnstile installation and point of purchase system are shown in FIG. 1a, but it should be understood that one such scan control and accounting system 104 may be designated to control a master database which is updated from many registration stations throughout the associated transit systems and/or event locations. These updates may be continuous or may be performed at intervals, either using a communications network or through personnel visiting the site and manually loading an updated copy of the database from electronic media. Transmitting this information electronically through a secure communications network is preferred in most cases, but a manual loading process may be appropriate in installations where communications infrastructures are limited or where the system to be loaded is located in a remote area. This database may serve, and/or may be replicated at, a plurality of scan control systems which control the operation of turnstiles at a plurality of locations. The accounting and financial network interface functions of computer 104 may be centralized at a single scan control and accounting computer 104 or may be distributed through a plurality of such systems, and these options are available independently of whether the database is centralized or replicated at multiple locations.

In a preferred embodiment, turnstiles 102 are arranged with a dogleg shape having a first passage portion 114 at an angle of 30 degrees, 45 degrees, or between 30 and 45 degrees to a second passage portion 116. First passage portion 114 has an entrance 118 at which height scanner 120 is located. A biometric sensor 112 is located in each turnstile near the junction of first passage portion 114 and second passage portion 116, so that a user approaching biometric sensor 112 through passage portion 114 can present his iris for scanning by turning his head slightly toward biometric sensor 112. Biometric sensors 112 located in turnstiles 102 are connected to height sensors 120 of each turnstile respectively, and are provided with an automatic aiming adjustment for the image gathering mechanism in biometric sensor 112. The aiming adjustment responds to the output of the height sensor to adjust the vertical aim of the image gathering mechanism, so that it adapts to users of various heights and captures the image of the iris of users regardless of their height.

Turnstiles 102 may also be arranged in other manners, for example, in a straight (non-dog-leg) orientation, depending on the space available on site. However, the dogleg orientation is preferable when the biometric sensor 112 is an iris scanner, because this configuration positions the user's eye more naturally with respect to biometric sensor 112 as the user passes through the turnstile.

Biometric sensor 112 is separated from height sensor 120 by the length of first passage portion 114 to allow time for the automatic aiming adjustment to operate as the user walks from height sensor 120 to biometric sensor 112. Depending on the speed of the aiming adjustment response, the length of first passage portion 114 may be very short, or may be 5 feet to 6 feet in length or more, if several seconds time is needed after the point of height detection to achieve the desired aiming adjustment.

Each turnstile 102 may further include a turnstile barrier mechanism 122 at the exit point of turnstile 102. The preferred embodiment for mass transit and stadium applications would include such a barrier mechanism 122 to enhance crowd control and minimize requirements for monitoring and security personnel. However, for airplane loading and other applications where an attendant will be present at the entry point, the barrier mechanism may be omitted. In fact, in such applications where space is at a premium and other security measures are already in place, the walls defining first passage portion 114 and second passage portion 116 may be omitted so that turnstile 102 is an identification station effectively consisting only of biometric sensors 112 and associated indicating, signaling, computer, and communications components. In this embodiment, the system is located at a threshold, or point of entry or exit, but provides only an indicational barrier and not a physical one. Thus, the form of the means selected for providing a turnstile function may encompass a broad range of degrees of physical barrier provided, and may in some embodiments provide only an access permission indicator without any form of physical access prevention.

Turnstile barrier mechanism 122 is connected to scan control and accounting computer 104, for example, by a serial digital data connection through a standardized serial port on computer 104, and associated interface on barrier mechanism 122. Turnstile barrier mechanism 122 can be selectively actuated by scan control and accounting computer 104 after valid identification of the user and validation of the user account, to permit the user to enter the controlled area. Turnstile barrier mechanism 122 can be a mechanical turnstile that selectively physically opens or unlocks to permit entry, or may be an optical turnstile which sounds an alarm if an infrared beam crossing second passage portion 116 is broken without the user first being authorized through the identification scan of biometric sensor 112. One example of an optical turnstile is the Model HP100 system manufactured by Omega Optical Turnstiles of Walnut Creek, Calif. This turnstile is designed to provide access in response to presentation of an access card. The operational control of the turnstile may be modified (according to the present invention) by removing the card scanning and authorization system, and connecting the turnstile sensing and alarm system to instead provide access in response to an "open" command signal from scan control and accounting computer 104. If the user crosses the infrared beam of the optical turnstile without first obtaining authorization through the scan of biometric sensor 112, an alarm will sound. Crossing of the beam by the user resets the turnstile 102 to permit the next user to enter at entrance 118 and undergo the authorization process.

In prior art applications where iris scanning is used to control access to secured areas, the iris scanner is typically activated by a "start" button on biometric sensor 112 which is pressed by the user. In the present invention, however, it is most preferred to operate sensor 112 without a start button, in a free run mode wherein sensor 112 is continually attempting to acquire an iris image and automatically resets and retries recognition after any unsuccessful attempt at recognition, without the user taking any action.

In the case of multiple ticket purchases (e.g. if the user has purchased four seats for an opera), the validation of that user's identity will sequentially actuate barrier mechanism 122 to allow all of the assembled members of the user's party to enter. For example, if four tickets were purchased by a person, four persons would be allowed to proceed through barrier mechanism 122 without sounding an alarm, upon validation of the purchaser's identity at biometric sensor 112.

The operation of the system is controlled by scan control and accounting computer 104, which is operably connected to both monitor and control all of the biometric sensors 112, height sensors 120, and barrier mechanisms 122 in the manner described herein.

The identification certainty level of the biometric comparison performed by scan control and accounting computer 104 can be adjusted appropriately depending on the circumstances and the nature of the access provided. For example, the harm associated with allowing a person to ride a transit system without an appropriate charge to his account may in some cases, particularly at peak load times, be considered more acceptable than passenger inconvenience associated with a backup at the turnstile due to an identification failure. It may be desirable to reduce the confidence level required for a match at such times, yet user accounts should be protected against accidental charges incurred by another person. Thus, in some instances a user may be allowed to enter without a charge to any account if the system identifies a probable but not definite match, if the identification is at a confidence level that is sufficient to make it worthwhile not to inconvenience that rider and those behind him, but not sufficient to justify a definitive charge to his account.

In one embodiment appropriate for transit systems, turnstiles 102 may be provided both at the user's entry point and at an exit point, similar to the placement of conventional farecard readers in the Washington D.C. Metrorail transit system, so that scan control and accounting computer 104 can record the entry point in database 106 and then later learn the exit point, to calculate the correct fare to be deducted from the user's account based on distance traveled. Flowcharts of the entry and exit processing required for such a system are shown in FIGS. 9a and 9b, respectively, while a block schematic diagram of the system with both entry and exit turnstiles is shown in FIG. 9c.

Figure 9C:
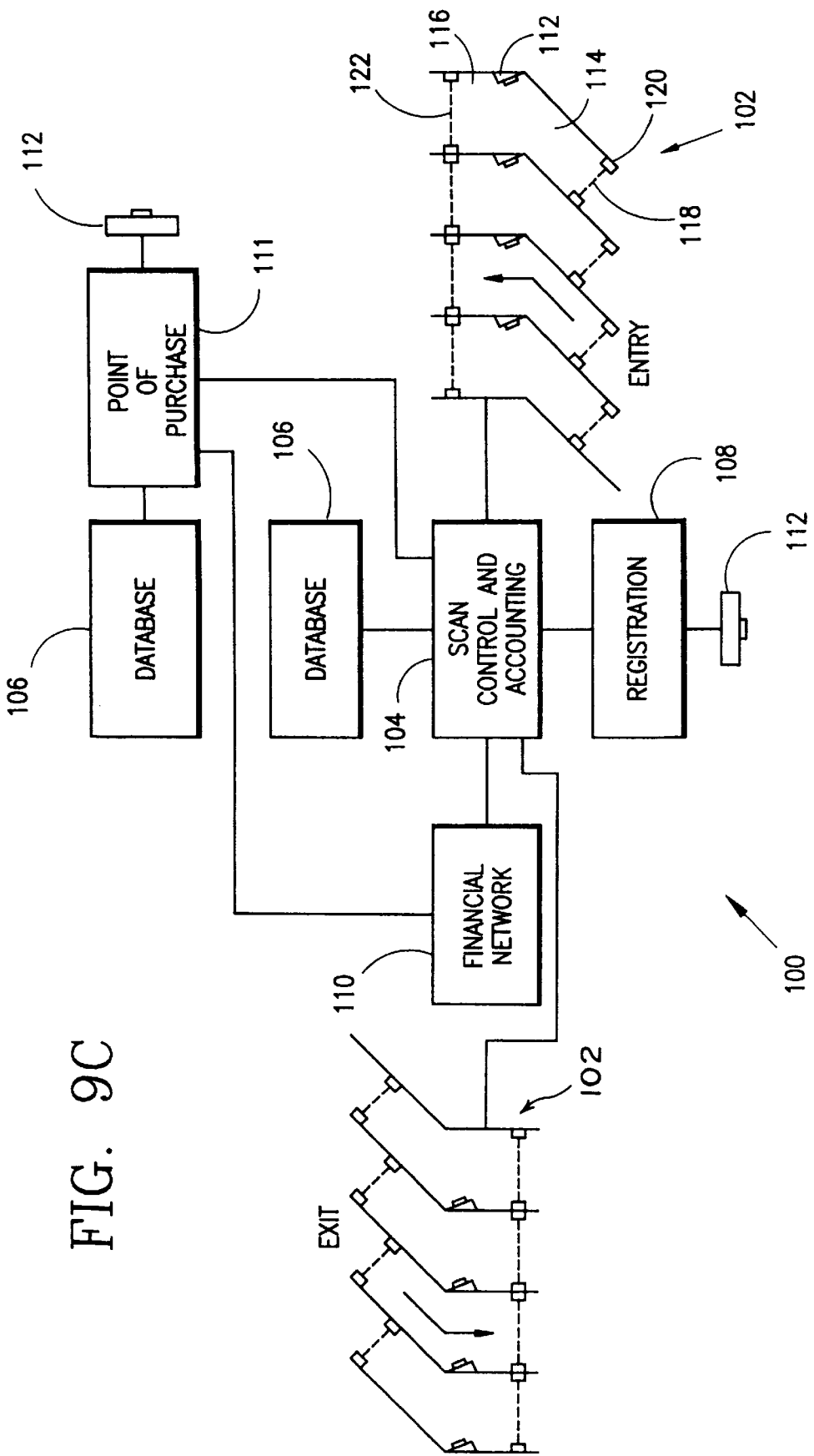
FIG. 9c is a block schematic diagram of a system including biometric turnstiles at both entry and exit points.

As shown in FIG. 9a, beginning with Block 902, upon a user presenting himself at a turnstile, the user is identified biometrically in the manner described above. Next, in Block 904, the entry point (station identification) is recorded in database 106 of scan control and accounting computer 104 (both shown in FIG. 9*c*). The entry point information is stored in correlation with the user's identification, and may thus be stored either in conjunction with the user record in database 106, or in a separate database along with some form of user identifier. In Block 906, the user record is flagged as being "in system" to facilitate accounting and egress identification. This flagging operation may be performed by setting a flag in the user accounting record in database 106, or a separate list of users who are "in system" may be maintained and referenced to achieve similar operating results.

Referring now to FIG. 9*b*, the images collected by the biometric scanners located at the exit point can be appropriately compared with a subset of the overall database of stored images, representing persons who have entered the transit system but have not exited, as shown in Block 908. This operation is facilitated by the previous storage of information indicating who is in the system, as described above. Making the comparison to this subset of images, while excluding other stored user images, increases system search and response speed. The confidence level required for a match at the exit point may be downgraded, as compared to the confidence level required to determine entry, since it is assumed that a match at the exit point should definitely be found with a person "in the system" at that time. Of course, if no match is found to a user of record in the system, control passes to Block 910 for error processing. In Block 910, the search may be expanded in a second phase to encompass all available image records, the user may be directed to see an attendant for assistance, an indicator may be provided, and other desired error processing and signalling may occur.

Figure 1B:
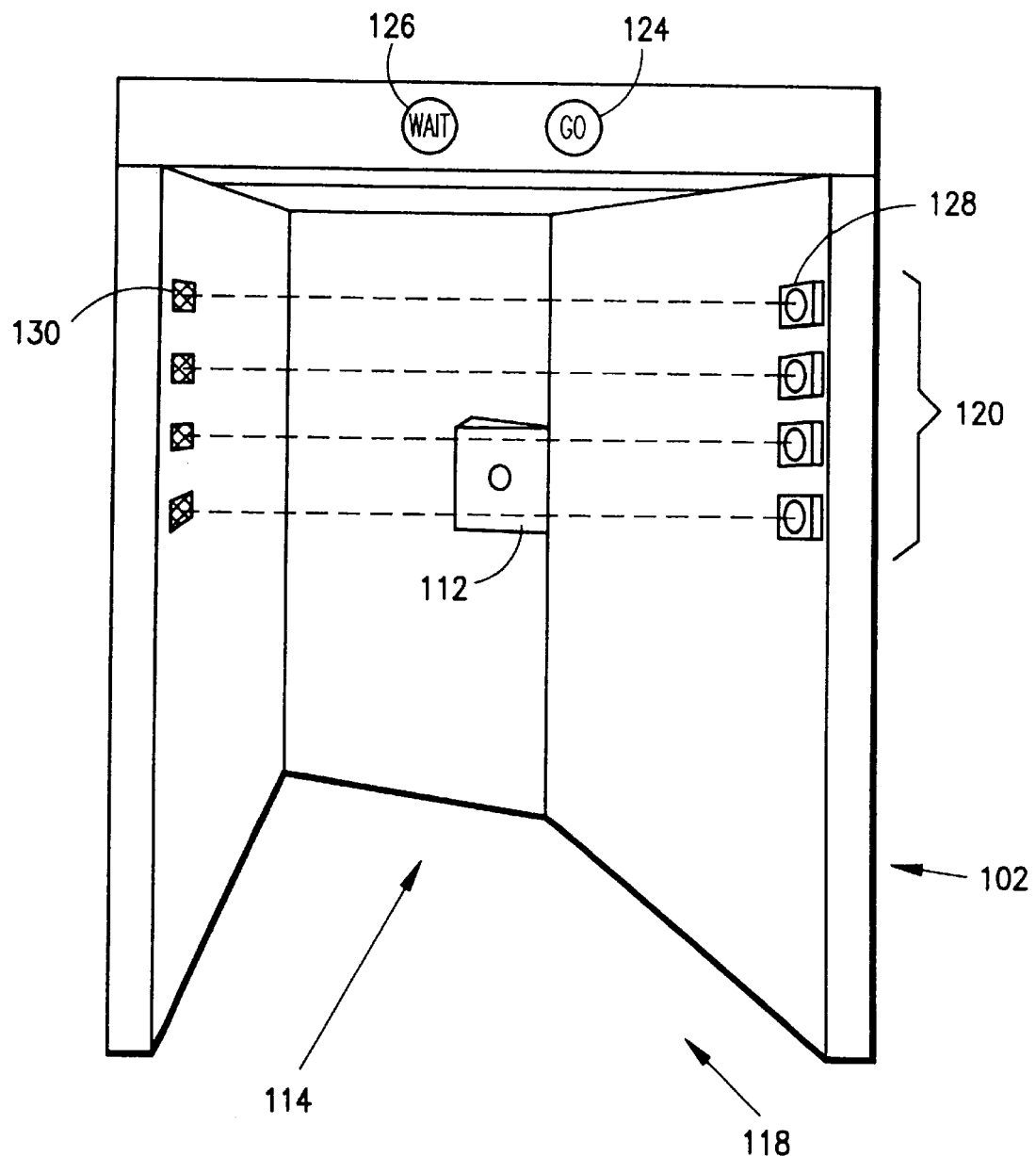
FIG. 1b is a front view of a turnstile apparatus of FIG. 1, showing one embodiment of entry signals and height detectors according to the invention.

FIG. 1*b* shows entrance 118 to turnstile 102 which is provided with a height sensor 120. As shown in FIG. 1*b*, height sensor 120 may be a series of closely spaced light beam transceiver units 128 paired with associated reflectors 130. Four such pairs are shown as an example, but 8, 12, or more pairs may be provided to obtain a desired increment of height detection to properly align the image scanning camera of biometric sensor 112 with the iris of the person entering the turnstile. In operation, the system determines the height of the user by identifying which light beams are interrupted as the person passes through entrance 118. The height of the individual can be estimated as less than the lowest beam which is not interrupted, and greater than or equal to the height of the highest beam which is interrupted. In particularly preferred embodiments, the height sensor 120 may use a tracking infrared or laser mechanism to intelligently measure the height of the customer.

FIG. 1*b* further shows indicators 124 and 126 which may be colored green and yellow and visually indicate "GO" and "WAIT," respectively, under control of scan control and accounting computer 104. The WAIT light 126 will be illuminated while a person is being scanned to obtain access, to indicate to subsequent persons that they should wait before passing through height detector 120. When a user has been authorized and the barrier mechanism 122 has been released to allow that person to continue through the turnstile, WAIT light 126 is extinguished and GO light 124 is illuminated to indicate that the next person in line may proceed.

Figure 2:
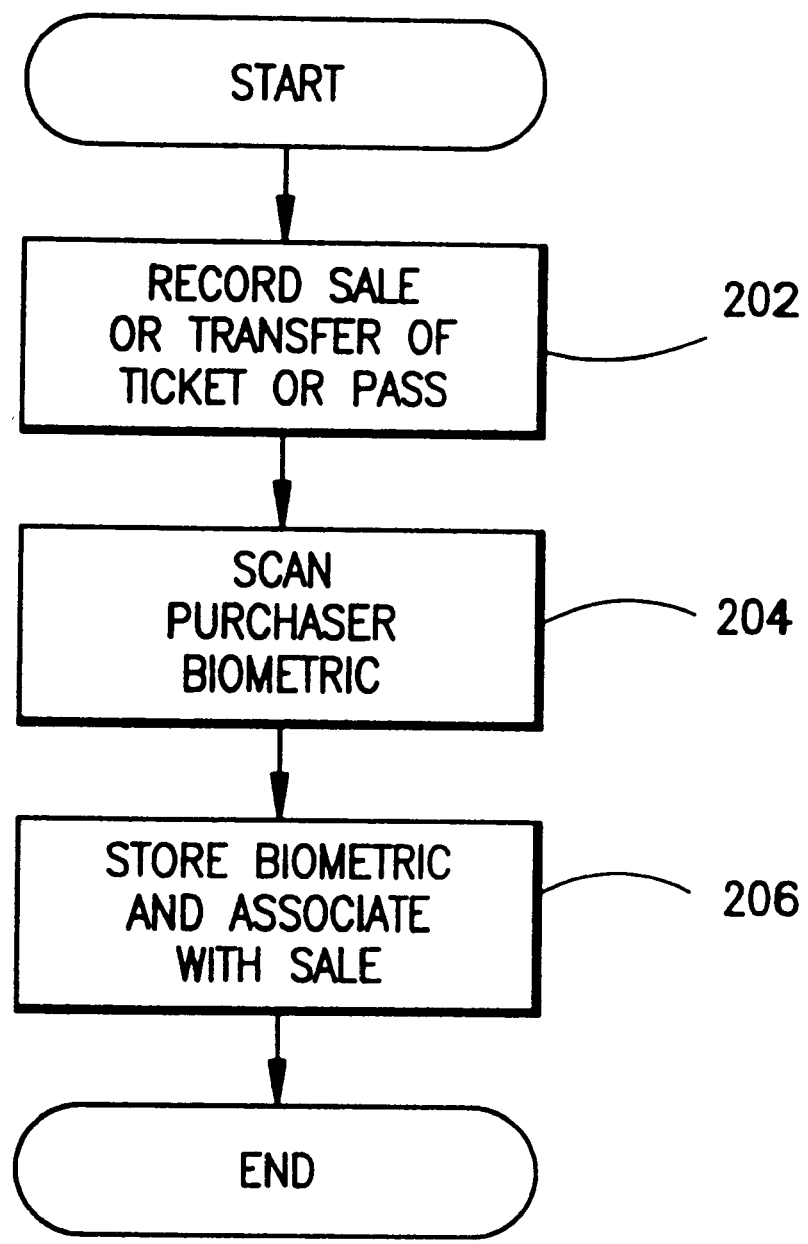
FIG. 2 is a flow chart showing an access purchase and biometric registration process of the present invention.

FIG. 2 is a flowchart showing a record creation sequence according to the present invention, which may be implemented using the equipment shown in FIGS. 1*a* and 1*b*, and in particular, the registration station 108. Registration station 108 is preferably an automated ticketing station, but may also be attended by an operator. Referring now to FIG. 2, in the first step (block 202), registration station 108 receives information from the user or from an attendant about the type of purchase desired by the user (for example, a certain number of a selected class of tickets to a particular event, or a predetermined credit toward transit fares to be incurred). Payment and/or payment information is obtained, as by the swipe of a credit or debit card, insertion of cash, or provision of bank account information for debiting purposes. The sale of the ticket(s), transit fare credit, or the like is then recorded in database 106 (shown in FIG. 1*a*).

A PIN number or other similar security code selected by the user is preferably recorded at the time of purchase. This code may subsequently be used by the user as a form of identification in case of difficulty with the biometric identification system. The PIN or security code may also be used by the purchaser if he wishes to authorize another person to use the tickets without his presence, i.e. if the tickets are a gift. In this case, the original purchaser will give the PIN number to the intended user, and such intended user will be permitted to re-register the tickets on the assumption that any person possessing the security code or PIN number chosen at the time of purchase is authorized to perform such re-registry.

In the next step, shown in block 204, the user's biometric information is obtained. As noted above, any known desired biometric quantity may be used for identification, but in the preferred embodiment, an iris pattern is obtained through biometric sensor 112 attached to registration station 108.

Finally, in block 206, the biometric scan information is stored in database 106 in association with the record of the user showing the services or access purchased by that user. In this manner, the biometric information is available to identify the user at a future date when the user wishes to use the tickets or fares purchased in this manner.

Preferably, the purchaser's biometric data is also stored with information identifying that person, so that subsequent purchases can be made without the physical presence of the purchaser. Once his biometric information is on file, a user may subsequently telephone a box office and order tickets, to be picked up based on the user's biometric data associated with the pre-existing account. Other purchases, such as concessions, gift shop, news stand, and other purchases within the transit system, stadium, or hall, may also be charged to the user's account based on a biometric scan at a station provided for this purpose.

In the case of transit usage, it may be particularly desirable for the rider to arrange for automatic charges to his credit card or bank account whenever his balance drops below a defined threshold. For example, an initial account balance of $30 may be established, and usage fees, fares, ticket fees, concession charges, etc. may be applied against this balance. Then, when the balance drops to zero or some predetermined minimum threshold such as $5, another $30 charge may be applied to the user's credit card or bank account, to again provide a ready balance against which the user can charge purchases, fares, etc. Database 106 will store information identifying the account as one which authorizes such automatic charges, and scan control and accounting computer 104 will process the charges through financial network 110 as appropriate.

Payment for the goods and services which may be obtained on the user's account may be made through any desired mechanism, although electronic transactions are preferred in view of the volume of transactions experienced in the typical application of the invention. The method or methods of payment to be used for a particular account are indicated by a code and requisite data (e.g. account numbers) stored in the database at the time of registration. Different payment methods may be used for different types or dollar values of purchases, if desired. For example, debits to an internal deposit account may be used for transit fare purchases, while other types of purchases are processed as direct credit card transactions. Alternatively, amounts under a limit such as $5 are charged to a deposit account, while larger amounts are charged to the user's credit card. User and/or system preferences for payment mechanisms are recorded in the database. User preferences are accepted by the system based on a predetermined rule set. User preferences are also limited, where applicable, by the creditworthiness of the user or the willingness of the operating entity to extend credit to the user.

There are several payment mechanisms that are particularly preferred in the context of this invention. All of these methods involve creating a debit to an account held by the user. This debit may be either to an internal or external account with respect to the system. Also, the account may be a credit account or a deposit-type account with a positive balance against which charges are deducted. One particularly preferred method is the deposit account mechanism described above, where an initial account balance is established, with automatically triggered replenishment of the balance as it becomes depleted. This method is particularly useful in transit applications where the user may incur regular small charges in daily commuting. Another possible mechanism is an immediate debit to one of the user's accounts for each charge made using the system. Because of transaction processing costs, this mechanism may be less desirably applied to frequent, small charges, but may be highly desirable for larger charges such as air fares or the purchase of team logo items in a stadium.

The account debited in this manner might be a credit card account or a financial institution account belonging to the user. However, a credit account internal to the system might also be established, with billing to the user monthly or at another convenient interval. A hybrid of these two methods may also be provided. In the hybrid approach, a credit-type account is created internal to the system and various charges are accumulated for a predetermined period, such as one day, one week or one month. The total charges during that interval are then transmitted in a single transaction to the user's credit card account or paid in an electronic funds transfer from the user's financial institution account. In this case, if the total charges to a user's internal charge account exceed a predetermined dollar value, or established credit limit, the charges may be paid off by charging a credit card or bank account even if the predetermined period has not yet elapsed.

Sensitivity to privacy concerns is important in implementing the present invention. The level of detail provided in billing statements or confirmation statements should be carefully selected to provide information sufficient to satisfy the user that charges made were legitimate, without transmitting information that might be sensitive. For example, it may be desirable to indicate on a statement the number of transit trips made in a week or month and the total fare, while omitting information such as the date, entry and exit station, and exact times of entry and exit for each trip. Detailed information identifying each transaction, and a transaction identification number or code assigned at the time of the transaction, is preferably recorded in the billing computer system in case of a customer inquiry about the accuracy of the bill. The user's account record may have each relevant transaction identification number or code entered therein so that detailed information can be obtained in case of an inquiry or challenge. However, detailed transaction information is preferably not released to anyone except the particular user in response to a specific request.

Another particularly important method of payment is the anonymous account. Some individuals may, because of privacy concerns, prefer not to identify themselves by providing name, address, etc. to the system. Of course, if the system is to transfer funds from a user account at a financial institution, or make credit card charges, an appropriate authorization is required and such authorization inherently requires personal identification. Thus, an alternative payment mechanism is needed for the anonymous account. In a preferred embodiment, anonymous accounts are provided as cash deposit accounts. Thus, if a person wants to access a transit system using the biometric identification system of the present invention, but does not want to be directly personally identified to that system, the person may register for an account anonymously, and make a cash deposit against fares or other goods and services to be charged against the account. The user's biometric data (such as an iris scan) will be recorded, but the account will be identified only with an anonymous account identifier or number rather than with the person's name and financial account information. To continue use of the account, the user will be required to make additional cash deposits to maintain a positive balance at all times, since the system will have no identifying information with which to institute collections efforts if the user owes money. To facilitate operation of anonymous accounts without service interruptions, the system may have a "low balance" indicator which is activated as the user passes through a turnstile or makes a purchase if the remaining account balance falls below a predetermined threshold, such as $10. This indicator will remind the user to again visit the registration station, where the user will identify his or her account (by account identifier, or preferably by biometric scan of the user) and provide an additional cash deposit. If the system is one in which charges vary depending on the entry and exit points, and the balance falls below another predetermined amount (e.g. the minimum fare currently in effect or an arbitrary minimum such as $5) admission may be denied until the balance is increased, to prevent the user from becoming stuck in the system without the resources to pay the charge due upon exiting.

Figure 4:
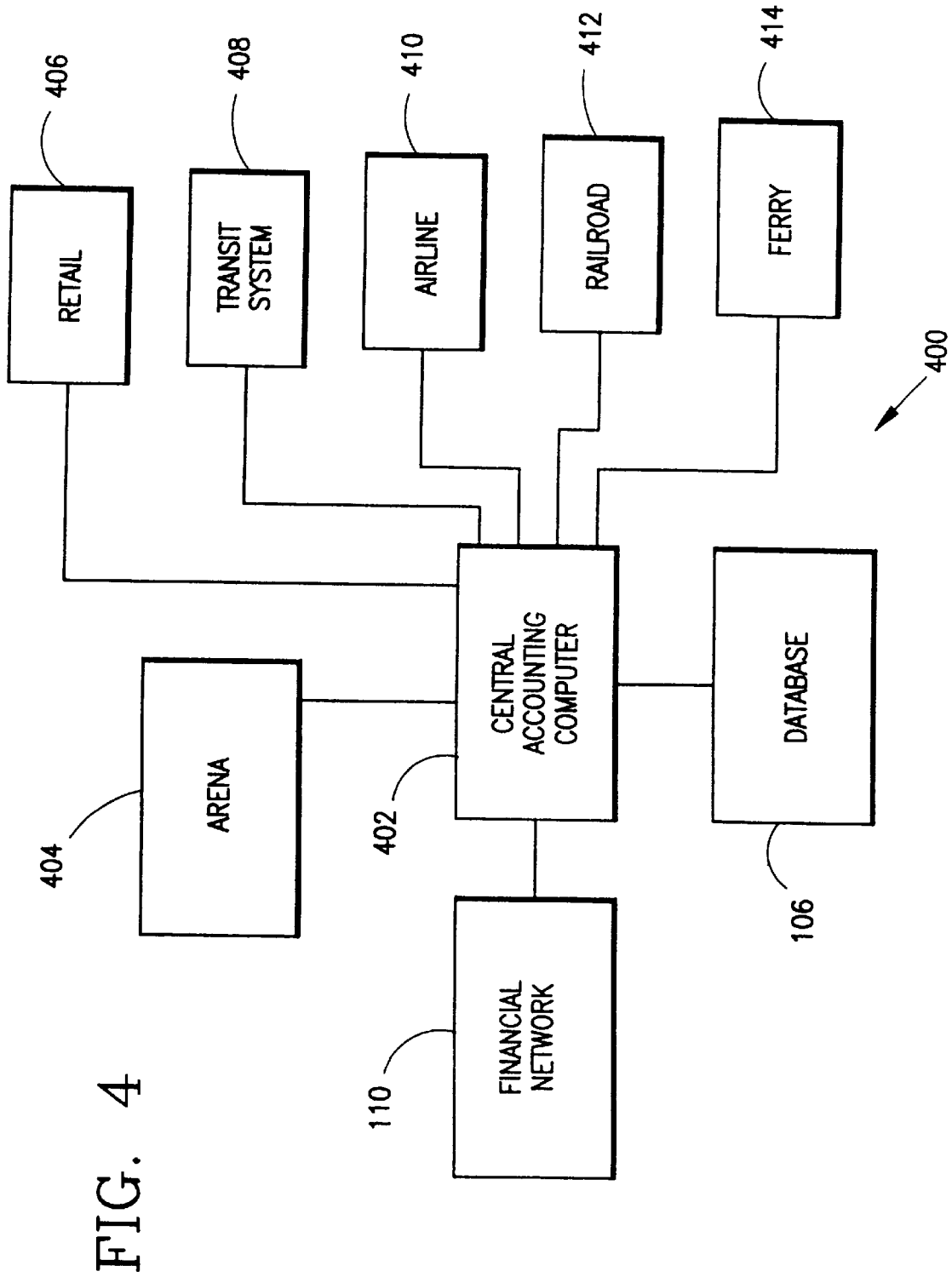
FIG. 4 is a block schematic diagram of an intermodal computer network embodiment of the invention.

The user may register a single account which is then usable at multiple locations, such as a plurality of different transit networks and companies, multiple stadiums, arenas, and event halls, and other locations. In this embodiment, an intermodal transportation payment and identification scheme is provided, whereby a user can readily fly, ride mass transit, take trains, busses, ferries, taxis, etc. in a variety of cities and even nations, without the need to carry money or identification. Turnstiles and associated scanners may be provided at the entry and/or exit and/or payment points as appropriate, for each transit system, concession stand, or store in the system. FIG. 4 shows an intermodal computer network 400 for implementing this embodiment of the invention. Central accounting computer 402 is connected to financial network 110 and master database 106. Arena 404, Retail store 406, rapid transit system 408, airline 410, railroad 412, ferry 414, and other desired point of entry or point of purchase systems are connected to central accounting computer 402. These individual systems incorporate biometric scanning, matching, and access control systems as shown in FIG. 1a. Preferably, the individual systems also incorporate registration stations and regularly updated copies of master database 106 to facilitate local user identification and access or purchasing control. The individual systems preferably transmit accounting information defining user transactions to central accounting computer 402, which processes the transactions in the manner described above with reference to scan control and accounting computer 104 (shown in FIG. 1a).

As shown, in intermodal type applications, a central computer database and billing system may be provided to maintain user information and process charges in a uniform manner across the several systems or installations. Alternatively, separate user databases and billing systems may be maintained by the various systems if desired. The separate databases may be updated either through a regular program of information exchange, or upon first use of a new system by a traveler or event attendee. The first time the user is a customer of a system other than his or her "home" system, the user may be required to undergo at least an abbreviated registration process in which the previously recorded biometric data and associated account data are transferred from the home system. This may be done automatically through a program of concentric expansion of search scope to neighboring or interconnecting systems, if the user is not recognized in the local system database. The registration process on first use of a new system may also be performed by obtaining identifying information from the user and requesting the specific record from the home system.

The registration station may be in a fixed location or may be mobile. It may also be provided as a standalone station which is selectively connected to a network to upload new registration information, or may be networked full time. To the extent account balances are maintained in the system, such account balances are preferably maintained uniformly by all stations in the system and updated consistently and in real time to avoid errors. The online operating system for allowing access preferably operates as a real time network of multiple transaction stations, with a central database for maintaining account information and balances. New account registrations may be added to the online system in real time or in a periodic batch (for example, in the early morning hours while a transit system or stadium is not operating).

In the case of access to a bus or other type of transportation that is not accessed through a station providing controlled entry and/or exit points, a standalone identification system is provided and a wireless packet radio system or other appropriate wireless communications system can be used to process transactions. Alternatively, the bus may have account balance information for registered riders loaded in the morning, and may permit use of the bus by any rider having access to credit or having at least a predetermined deposit balance such as $5, it being relatively unlikely that a single rider would incur more than $5 in bus fares within a transit system in a single shift.

Preferably the computers making up the system are networked, either in a private network or using public networks such as the Internet. Ideally sufficient communications bandwidth is made available to support fast comparisons between biometric data from a person seeking access, and the records in the database, so that the comparisons may be performed by a centrally located computer which also maintains account balances. However, in another, hybrid embodiment, the account balances are maintained in a central computer, but the biometric data in the account records is replicated in a computer at each turnstile site, so that comparison and matching can be performed locally, avoiding the need to transmit data files of biometric scans over a network in real time operation. The various onsite biometric comparison databases may be updated during periods when the system is not operating or has low load, such as early morning hours. In this hybrid approach, the computer associated with the turnstile matches the user's scanned data with a record. Information identifying that record and the amount to be debited is then transmitted to the central computer. Typically, this information might be contained in a single packet in Internet Protocol (IP) form or in another network packet form. Thus, the communications bandwidth requirement of this hybrid approach is much lower than the bandwidth required to complete biometric identification over a network. The hybrid matching and accounting system as described herein may be implemented with any of the hardware embodiments shown in the drawings, including the arrangement of FIG. 1a and the arrangement of FIG. 4.

Each user account can be selectively coded for any of the available payment mechanisms, based on user preference and creditworthiness. Additional user information and special purpose codes may also be stored in the database in association with the user account record established according to this process.

One type of special purpose code that may be stored, if desired, is a special access authorization code for use if a state of emergency is declared. This code can be used to restrict access to the controlled areas to particular persons or classifications of persons in case of a local or national emergency, and/or for verification and determination of travel priorities during time of war or other emergency.

Another type of special purpose code that may be stored is a code indicating a discount level or an additional level of service to be applied to certain purchases of transportation, goods, and/or services. For example, a discount may be automatically provided based on membership in an organization, such as the American Association of Retired Persons or the American Automobile Association. Additional service may be provided if the user is a member of some preferred customer group such as an airline frequent traveler program. As an example, upgraded accommodations, a free drink, etc. may be automatically provided where available, based on coding of the user in the system as a member of any such exclusive customer group.

The user may be designated by yet another type of special purpose code for receipt of frequent traveler or frequent user promotional points. An account balance for such promotional points is maintained within scan control and accounting computer 104 or in a central computer connected to scan control and accounting computer 104. Mileage rewards and other program incentives can then be earned by the user based on fares, events, and purchases made using the system and/or like systems associated with the system. A single incentive program may be administered centrally for an intermodal group of transportation companies, event sponsors, and/or other merchants associated with the system, or incentives may be provided by individual systems, event sponsors, or merchants based on purchase of their good and services through the biometric identification system.

A code may also be stored to authorize the dispensation of cash to the user, upon request, while passing through the turnstile, and to indicate an amount of cash to be dispensed. For example, a user may wish to have the option to press a button during the identification process and, following verification of identity, receive a $20 bill from a dispenser in the turnstile. Another user may not wish to have a cash issue option.

The process of FIG. 2 can also be executed in a manner which facilitates transfer of previously purchased tickets to another person. To facilitate this transfer, the purchaser may accompany the person receiving the tickets and be identified by biometric sensor 112, or else may provide the purchaser with a security code or PIN number (recorded at the time of original purchase), knowledge of which will permit that person to make use of the tickets. The system preferably charges an additional fee for the use of tickets by other than the original purchaser. Scan control and accounting computer 104 is preferably programmed to establish a monetary charge for this transfer service, to request bank account, debit, or charge card information from the transferee, and to charge the transferor and/or transferee (using previously stored information from the transferee) for the ticket re-registration service, using financial network 110 to process the charges. Financial network 110 may also be used to provide interchange between currencies so that purchases can be made in a variety of currencies, particularly in the case of international air travel.

Figure 3:
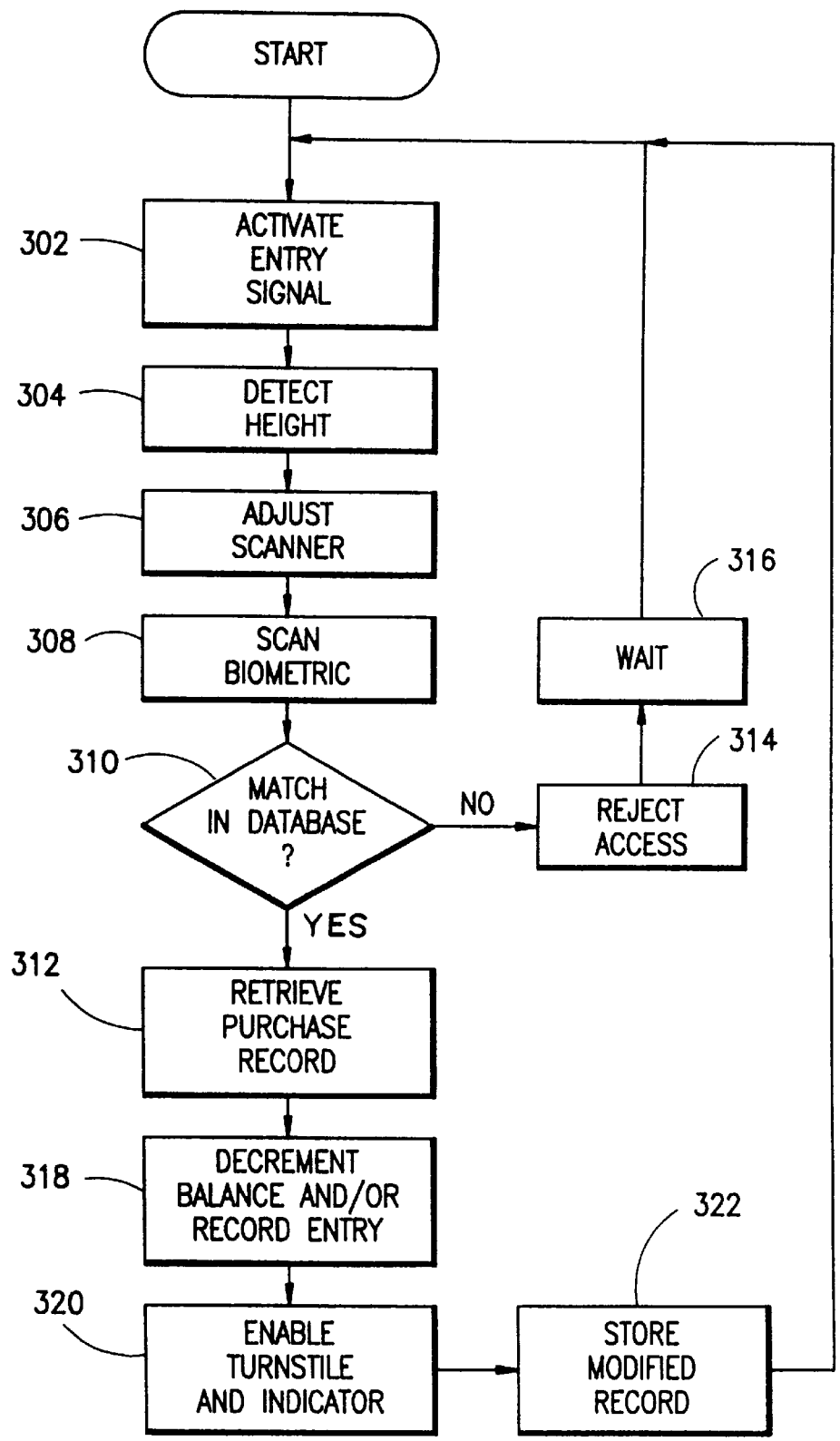
FIG. 3 is a flow chart showing operation of a biometric access verification and accounting process used with the apparatus of FIG. 1.

FIG. 3 is a flow chart showing the entry (or exit) authorization process according to the present invention using the novel turnstiles 102 shown in FIGS. 1a and 1b. Beginning in block 302, "GO" signal 124 is activated to allow the next user to enter the turnstile. In block 304, the user's height is detected using height sensor 120. In block 306, the aim of biometric sensor 112 is adjusted according to the measured height of the individual entering the turnstile, so that sensor 112 is at least roughly adjusted to the height of the individual (if necessary, fine adjustment of camera aim may be controlled by image analysis and a feedback controller in biometric sensor 112). Also, in some cases the height may be measured inaccurately by height sensor 120 (e.g. if the user is carrying a tall object or wearing a top hat). If the image sensor of biometric sensor 112 is unable to lock on to the image when adjusted to the detected height, it will enter an automatic scan mode and attempt to acquire the user's iris image at various other heights until successful or until a predetermined time-out occurs.

In block 308, the biometric information is obtained by scanning the person in the turnstile. In block 310, the obtained information is compared to data stored in database 106 to determine whether there is a match within a programmed level of certainty. If not, control passes to block 314 and access is rejected, and following a wait state in block 316 to allow the rejected user to leave the turnstile, the turnstile resets and is ready for the next user as control passes to block 302.

If there is a match with the database, control passes to block 312 and the identified user's purchase record is retrieved. In the case of a fare or access balance which is to be decremented, the record is adjusted appropriately. In the case of a ticket for an event, or in the case of entry into a system where the charge is made upon exit, the system merely records the entry of the identified person into the controlled area (indicating the use of the ticket, or indicating the station where a transit user initiated his trip). In block 320, the access control mechanism 122 is released to allow the defined number of persons to enter the controlled area and an indicator is actuated so that the user knows he (and his party, if applicable) may proceed through the turnstile. The modified record is then stored in block 322, with an indication of ticket use, entry, and/or entry location if appropriate, and with a decremented account balance if appropriate. Control then returns to block 302 and the turnstile is ready to identify and provide access to the next user.

Figure 5:
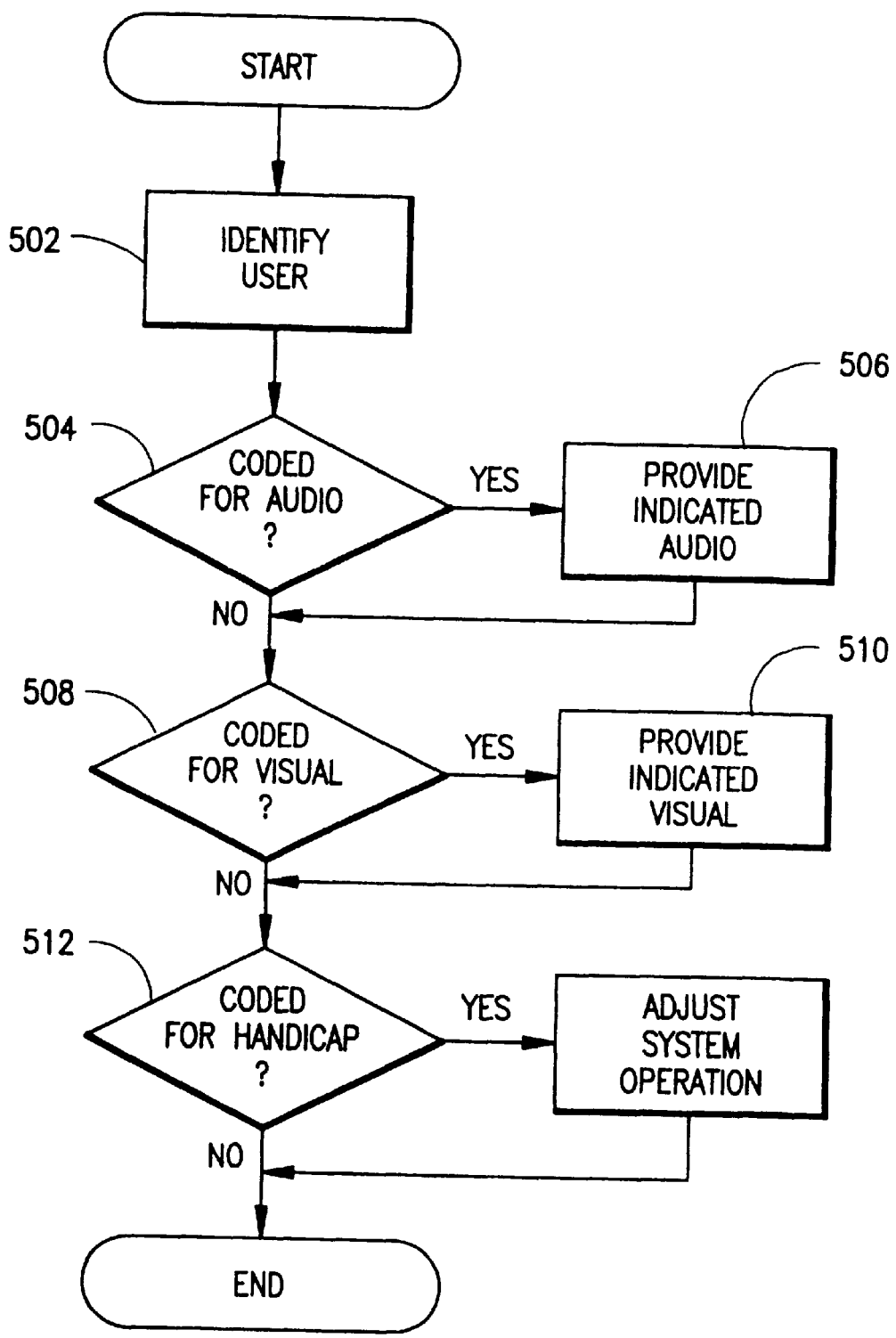
FIG. 5 shows a process for providing visual and/or audio indications to a user, to indicate when identity has been validated and entry is possible, and for adjusting system operation based on stored user profile codes.

FIG. 5 shows a process for providing visual and/or audio indications to a user, to indicate when identity has been validated and entry is possible, and for adjusting system operation based on user codes. Barrier mechanism 122 (shown in FIG. 1a) preferably has a visual indicator associated therewith for this purpose, such as a selectively illuminated indicator. An audio signal may also be provided to indicate authorization and/or failure. The audio signal may include a chime, voice recording, and/or digitally synthesized personalized welcome message such as "Welcome, Mr. Smith." The visual signals, and/or the audio signals, may be provided for each person using the turnstile. Alternatively, such signals may be selectively provided in a customized manner depending on who is using the turnstile.

More specifically, the operation of the turnstile system and associated indicators may be varied for individual customers following identification, depending on codes stored in the database record associated with that customer. The user is first biometrically identified in the manner described previously, as provided in block 502. Next, the user's record is retrieved and in block 504, it is determined whether an audio indication should be provided, and if so, what type of audio indication. If an audio indication is to be provided, control passes to block 506 and the audio signal is provided. For example, if the customer's record indicates that the person has a vision impairment, an audio signal and greeting may be selectively activated for that person, while such a signal is not activated for other persons who were not coded to receive that assistance.

Next, in block 508, the system determines whether the user record is coded to receive a visual indication of approval, and if so, what specific visual indication should be provided. The desired visual indication is provided in block 510 and control then passes to block 512. In block 512, the system determines whether any special codes are associated with the user account for varying operation of the turnstile or for providing other assistance to handicapped persons. If so, in block 514 the system operation is adjusted or assistance is summoned to accommodate the user.

In this manner, even the mechanical or electrically-actuated operation of the turnstile may be varied based on the customer profile. If the customer's record indicates that the person has limited mobility or uses a wheelchair, the turnstile may be actuated in a special mode allowing additional time for passage. Also, in the case of wheelchair users, the size of the turnstile opening may be automatically increased upon recognition, in response to a database code. This may be accomplished by providing a turnstile with a mechanical barrier having a maximum opening width sufficient to accommodate a wheelchair or other equipment, which can be selectively controlled to open to two or more different widths. The barrier is then actuated to open completely for persons who are coded as wheelchair users, but to open only partially for other persons. Alternatively, the special coding may result in automated dispatch of special assistance such as courtesy transportation.

The system has particular applicability to air travel and may be provided with customized features when used to control access to aircraft. In a typical aircraft reservation and boarding process performed according to the present invention, the user calls to make reservations or makes reservations using a computer. The computer may be a home computer connected to the Internet, at a kiosk connected to the system, a travel agency computer, a computer operated by a telephone reservationist, or an enhanced automatic teller machine.

Figure 6:
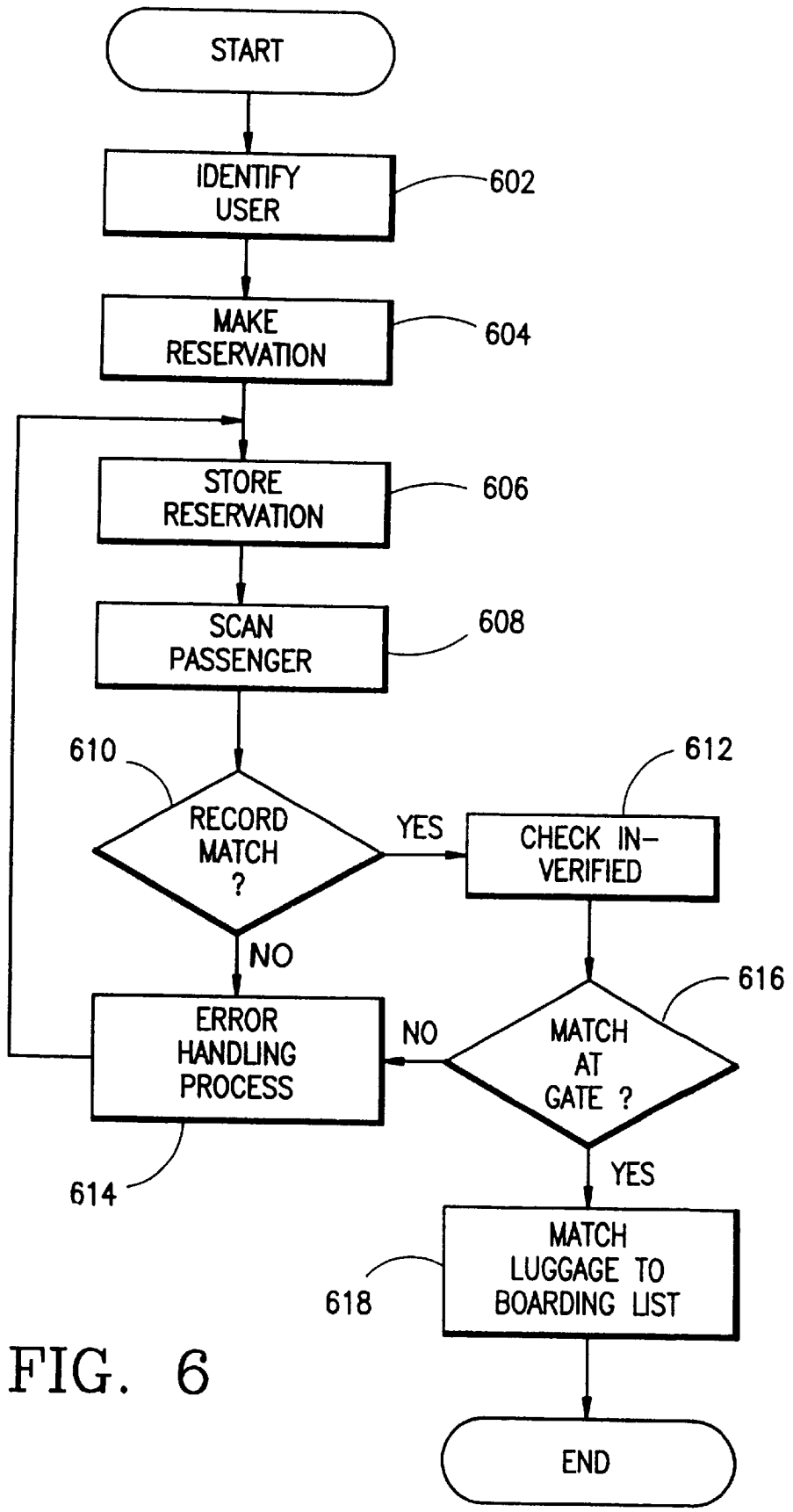
FIG. 6 is a flow chart of a preferred process according to the present invention for an air travel application.

A preferred process for implementing the system in an air travel application is shown in FIG. 6. To make a reservation, the user first identifies himself or herself as a registered customer using an account number or other identifying information, such as name and address, or preferably a biometric scan, as shown in Block 602. Next, the reservation information is received (Block 604) and the reservation information is recorded in conjunction with identification of the relevant user account (Block 606). Upon arrival at the airport, the user will be scanned at a biometric scanning station (Block 608). In block 610, the identity of the passenger is matched to the user account under which the reservations were made. If a match is found, execution continues at block 612 and the passenger is "checked in," i.e. the seat assignment is confirmed, luggage is tagged and accepted, and if desired, a boarding pass is issued. If desired, of course, the system may be used in a manner which substantially eliminates the issuance of tickets and boarding passes, based on scanning and verification of user identity at each stage of the luggage check and retrieval, area access control, and boarding process, where a boarding pass is traditionally used as identification.

If the user's biometric does not match that of a reservation, a manual error handling process is initiated as shown in Block 614. In this process, the user's identity is verified through additional forms of identification, and a decision is made whether to allow the person to board the aircraft. If the person is permitted to board, he or she is first registered in the system, and then checked in as described above. If the user is a first time user of the system, or if additional people are traveling with the user or on the user's account, their biometric information is registered either at the time of making the reservation, or at a station provided in the vicinity of the airport ticket counter.

For security purposes, the database may be internally scanned upon first access by a new user, to identify duplicate records indicating that the user has traveled previously under a different name, and such duplicates may be flagged for investigation prior to allowing the person to board the aircraft. Persons using the system for the first time may be required to show several forms of identification to ensure that false records are not created.

Preferably, in addition to scanning at the time of receiving a boarding pass, checking luggage, or "checking in," the user may be scanned again as shown in block 616, to verify identity at the gate during the process of boarding the aircraft. In this manner, only persons who have been positively identified and matched with a known user record which made the reservation will be permitted to board the aircraft. Again, if the biometric of a person attempting to board the aircraft does not match that of a checked in passenger, control passes to the error handling process in Block 614.

As another feature of the invention, shown in block 618, shortly before departure of the aircraft, the system may automatically generate a list of passengers who checked luggage but who did not actually enter the aircraft, based on biometric scan records at the gate. Any "unaccompanied luggage" may then be removed from the cargo hold as a security measure.

Figure 7:
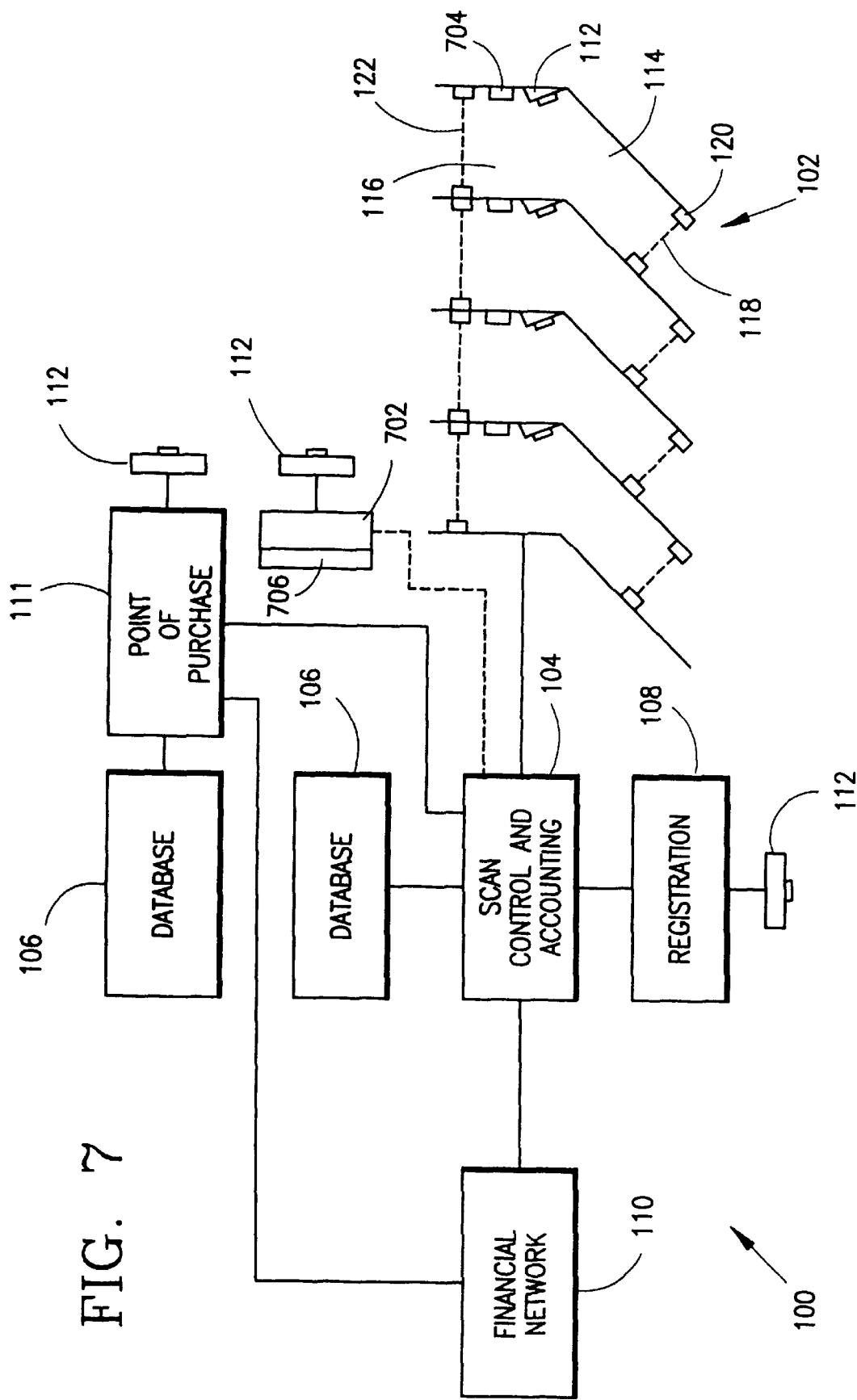
FIG. 7 is a block schematic diagram of an embodiment particularly adapted for use in a sporting arena environment.

The system may also be provided with particular enhancements for use as a sports arena or similar event-related application. A block schematic diagram of a system design particularly useful in a sporting arena is shown in FIG. 7. The hardware components of FIG. 7 differ from those shown in FIG. 1a in two major regards.

First, a portable point of purchase scanning computer 702 may be provided, preferably in a handheld form, incorporating a biometric scanner with an associated portable database for pattern matching. This handheld point of purchase scanning computer 702 may be used by concessionaires to record charges for concessions. The charge records may be communicated to scan control and accounting computer 104 via a wireless data link such as a packet radio transceiver 706, or may be held in memory and later uploaded to scan control and accounting computer 104 (also shown in FIG. 1a). Point of purchase units, either handheld or fixed, will similarly be provided at souvenir stands, fixed location concession stands, parking lot entry points and other places where funds are collected or access control is provided. For example, the identification system may be used in the manner described previously to control access to the stadium or hall, and a further identification and access control function may be performed by a scanner located at the entrance to a premium seating section, such as box seats or a club level.

Another feature particularly useful in event management where reserved seating is provided is the addition of a printer 704 to each point of entry turnstile, which automatically prints the user's seat assignment (and optionally directions to the seat) for the convenience of both the user and ushers, as the user enters the arena.

As an additional feature, the system preferably provides special codes in the database for recording that a user has paid for access to a particular event, such as a concert or movie, or on a particular date, in the case of access to a theme park or other location where a single daily fee is paid for the right to come and go at will during that period. In this manner, the practice of hand stamping or re-examining tickets of those who have left the area and wish to return can be eliminated. Reentry will be automatically provided to the patron based on a record of previous payment during the defined time period for unlimited access.

Special codes may also be provided for season ticket holders, e.g. those who have purchased unlimited annual admission to a theme park or museum so that access is permitted without further charge, upon identification of the user by the system.

It should be recognized that ticket purchases for events and associated seating reservations may be made in advance by telephone or computer, in the manner described above and/or in the manner described above for airline reservations. Alternatively, the system may be used to permit entry to museums, theme parks, etc. for which there is an admission charge but for which no reservations or seating assignments are required.

Figure 8B:
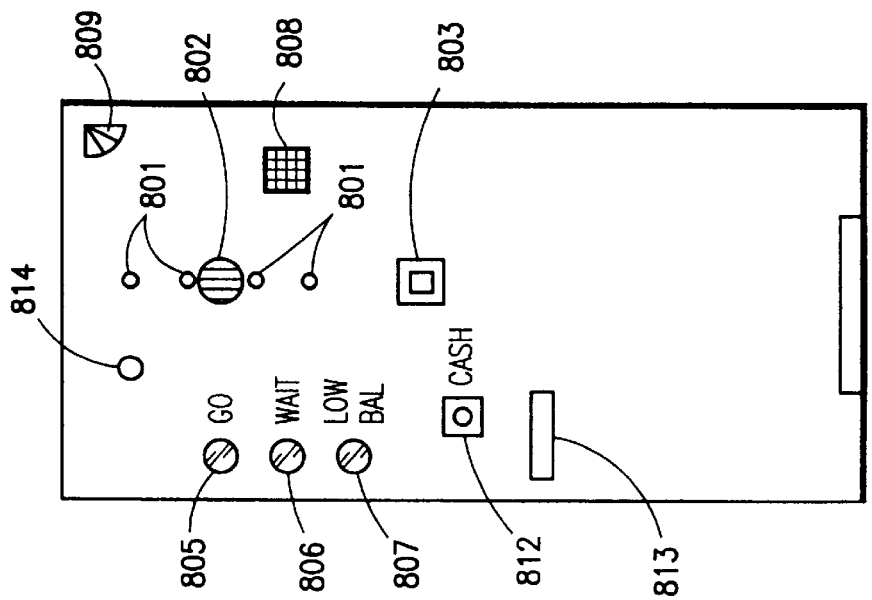
FIGS. 8a and 8b are a side sectional view and front view, respectively, of the operating equipment of another embodiment of a high throughput biometric turnstile according to the present invention.
Figure 8A:
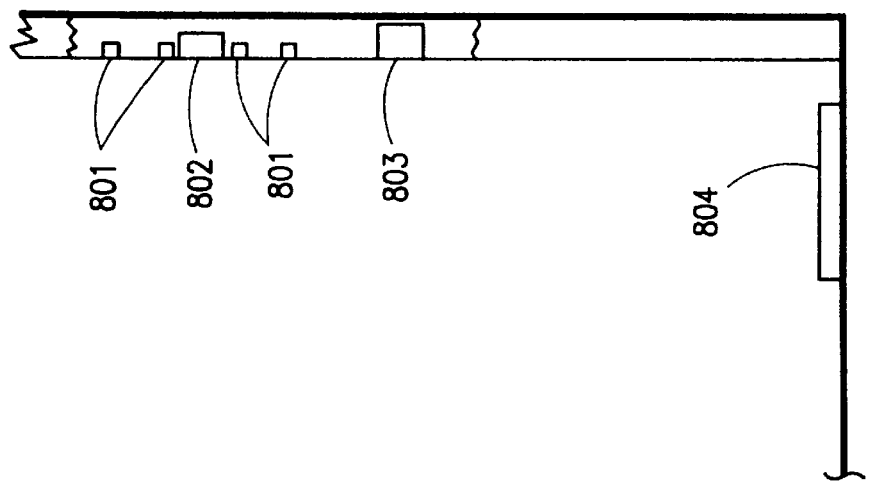

Another preferred embodiment of a biometric scanning turnstile according to the invention is shown in FIGS. 8a and 8b. In this embodiment, referring first to FIG. 8a, the turnstile is provided with an array of electronic imaging cameras 801, each arranged along a vertical line and separated by a uniform distance along the line. An aiming lamp 802 has a polarizing lens that makes the lamp visible only along a narrow field of view directly ahead of the lamp. The user will be instructed to position his or her right eye (or left eye, depending on which eye is registered in the database) so that it is possible to see lamp 802 at full brightness with that eye. This positioning orients the target eye directly before the camera array. The camera array is then activated and an image of the iris from one of the cameras in the array is selected for processing. The camera providing the best image will vary depending on the height of the user and will typically be the camera closest to the height of the target eye. The camera to be used may be selected by electronically analyzing the image to determine whether there is an iris image present. Alternatively, the camera may be selected merely by attempting to pattern match with all of the available cameras and ignoring those images which do not result in an iris recognition pattern match. As another option, the camera at the right height may be selected using the height sensor mechanisms and methods disclosed above with reference to FIG. 1b.

In another embodiment, instead of providing a camera array, aiming lamp 802 may be polarized in both horizontal and vertical directions. In this embodiment, the user positions the target eye so that he or she can see lamp 802 at full brightness, and this action inherently positions the eye at a predetermined height and lateral position at which a single camera 801 may be pointed to collect the needed iris image.

The camera(s) 801 may be provided with lenses having a high depth of field within the range of likely distances from the camera to the target iris. In this case, it may not be necessary to provide the lens with a focusing mechanism. This embodiment is preferred since eliminating moving parts may increase reliability of the turnstile equipment. Alternatively, the cameras may be provided with an auto-focus lens to provide a sharp image of the target iris.

Cameras 801 are shown in FIGS. 8a and 8b in a vertically oriented array, but it is also possible to provide an array that extends both horizontally and vertically for ease of capturing a desired iris image without requiring the user to be in a precise lateral position.

The turnstile may also be provided with sensors to detect the presence of a user to initiate the scanning process. For example, pressure sensor 804 or infrared motion detector 803 may be employed to detect the presence of a user.

As shown in FIG. 8b, indicator lamps 805 (go) 806 (wait) and 807 (low balance) provide operating status indications to the user. Speaker 808 selectively provides audio signals, feedback, and instructions. Special illuminating light or lights 809 may also be provided at predetermined orientations to enhance imaging by cameras 801. Lights 809 may be oriented to produce shadows across particular facial features for image processing purposes (feature recognition) or may be provided for general illumination. Lights 809 may be of a wavelength other than visible light, such as infrared, and the cameras selected may be particularly responsive to the wavelength of lights 809.

The turnstile may also include a cash request button 812 and a cash dispenser 813. If the user presses cash request button 812 during the identification process, if the user's account is coded appropriately, cash will be dispensed to the user. The amount of cash dispensed will be debited against the user's account in one of the manners described previously, including for example by electronic access to an external financial network to create a charge to a credit account or a deduction from a checking or other bank account.

A wide angle camera 814 may also be provided to obtain a video frame of the user's face during each identification process. This video frame may be stored in a mass storage device, along with data associating the frame with the specific transaction, for security, verification, and evidence-of-authorization purposes in case a user wishes to challenge a debit.

Figure 8C:
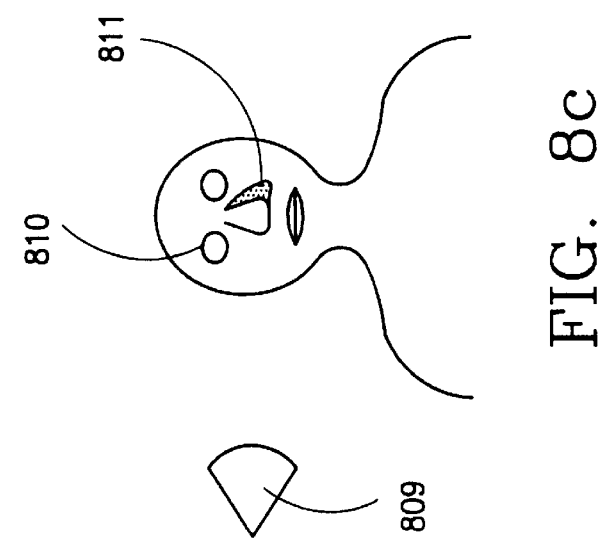
FIG. 8c is a front view of a person to be scanned, showing the positioning of a lamp to create desired illuminating effects.

In one preferred embodiment, light 809 is oriented to illuminate the right eye socket 810 and to cast a sharp nasal shadow 811 across the left cheek of the user, as shown in FIG. 8c. The nasal shadow 811 can be located by image processing to identify a dark region in that part of the image, and the portion of the image to the left and slightly up from the nasal shadow, corresponding to the expected position of the right iris at eye socket 810, is made the focus of the pattern matching processing.

In an embodiment of the turnstile system that is particularly adapted for movie theater admissions or other applications without reserved seats, but for which admissions must be limited, the identification station in the turnstile may be provided with a set of buttons or a keypad, allowing the user to select which movie he or she wishes to attend (for multi-screen cinemas). For example, buttons may be provided for "theater 1," "theater 2," "theater 3," etc. and the titles of the movies playing in those theaters may be provided on cards next to the buttons. "Sold Out" indicators are preferably provided next to the selection buttons for theaters having no ticket availability for the next show. Selectors may also be provided for different show times, if desired. A set of numbered buttons or a numeric keypad may also be provided to select a number of people to be admitted. In this manner, the user may obtain admission to a theater for himself and/or one or more guests by submitting to biometric identification, selecting the theater, and selecting the number of guests. The turnstile barrier will then be actuated to permit the selected number of people to enter. The user's account will be debited for the number of tickets obtained in this manner. The scan control and accounting computer 104 will keep a running record of the number of tickets sold for each theater and will activate the "Sold Out" indicator if no seats remain for a show.

Thus, systems and methods have been disclosed that provide substantial solutions to the problems experienced in the prior art with ticketing, transit fare, and other access control systems which rely on artifacts or which do not confirm identity between an individual purchasing the service or access, and an individual later making use of the service or access. The present invention provides fast and accurately controlled access to a controlled area or event without requiring the customer to carry an artifact.

The system according to the present invention enhances traffic flow, is more convenient for the passenger or spectator, and lowers operating costs for the transportation authority. In the case of air travel, in particular, the system enhances security by ensuring that the person who purchased the tickets, who is known and identified at that time, is the same person boarding the aircraft.

The present invention also makes it possible to have a national or regional registry permitting a registered user to make unlimited use of travel within that area, consistent with that person's creditworthiness. The registered user, for example, can make use of seamless intermodal travel involving different transportation authorities, such as getting on a bus one block from home, going to the subway, taking the subway to a railroad station, taking an intercity railway to another city, and flying home the same evening, all without showing any tickets and without taking out a credit card, checkbook, etc. since payments may be charged automatically to the registered user's accounts.

For sporting events, the present invention permits a national registration system which would allow enrollment or subscription to a league pass, permitting attending games of any team in the league.

What is claimed is:

1. An automated iris recognition identification and billing system for collecting air fares upon entry of a passenger into an aircraft, comprising:

account record storage means for centrally storing a plurality of passenger account records, each record including at least (a) iris recognition data sufficient to identify the passenger and (b) designation of a collection method to be used for collecting air fares incurred by the passenger;

iris identification means connected to said account record storage means, for recognizing the iris of a person seeking entry to the aircraft to obtain iris feature information sufficient to positively identify said person without the presence of other forms of identification, comparing said iris feature information to said iris recognition data in said passenger account records to match said person seeking entry to a matched passenger account record, and generating a signal identifying the matched passenger account record without requiring further identification;

account charging means connected to said iris identification means and said account record storage means, for receiving said signal identifying the matched passenger account record, initiating a financial transaction debiting the identified passenger for the fare, and generating an access permission signal indicating that the financial transaction has been processed without requiring further identification; and access authorization means connected to said account charging means for receiving said access permission signal and, in response to said access permission signal, indicating that the passenger may board the aircraft.

2. The system of claim 1 wherein for at least a plurality of said records, said collection method includes storing an account balance for the user, and deducting usage fees from said account balance as they are incurred.

3. The system of claim 1 wherein said account charging means incorporates means for maintaining anonymous user account records, said anonymous account records containing information identifying an account record to be charged, wherein said information in said anonymous account records is insufficient to personally identify the user.

4. The system of claim 1 further comprising:

cash request input means for receiving a cash dispensation request from the user;

cash request processing means connected to the cash request input means and associated with the account charging means, for receiving said cash dispensation request, initiating a financial transaction debiting the identified user for a requested amount of cash, and generating a cash dispensing actuating signal; and cash dispensing means connected to the cash request processing means for dispensing the requested amount of cash in request to said cash dispensing actuating signal.

5. The system of claim 1 wherein said account record storage means includes customized operation code storage means for storing at least one code specifying a functional operation of the system that applies to the user associated with a record containing said code, but not to all users, and further comprising customized operation control means associated with at least one of said account charging means and said biometric identification means, for varying the operation of the system according to said code stored in said code storage means.

6. The system of claim 5 wherein said code indicates an operational accommodation of the system for a disability.

7. The system of claim 1 further comprising a registration station for creating new user account records, said registration station including:

biometric scanning means for scanning at least one biometric feature of a registrant to obtain biometric data sufficient to identify a user;

account record creation means connected to said biometric scanning means for creating a user account record, each record including at least (a) biometric data sufficient to identify the user and (b) designation of a collection method to be used for collecting usage fees incurred by the user; and data transfer means associated with said account record creation means, for adding new user account records created by said account record creation means to said account record storage means.

8. The system of claim 7 wherein said registration station further comprises means for modifying and updating existing user account records.

9. The system of claim 7 wherein said registration station further comprises code entry means for receiving customized operation codes specifying a functional operation of the system that applies to the user account record, but not to all users, and for storing said code in said user account record.

10. The system of claim 1 wherein said account charging means is connected to a financial data transmission network and selectively initiates an electronic financial transaction using said network to obtain payment from the user.

11. The system of claim 10 wherein said electronic financial transaction is a credit account charge.

12. The system of claim 10 wherein said electronic financial transaction is a bank account debit transaction.

13. The system of claim 10 wherein said electronic financial transaction is for an amount larger than the incurred usage fee and is selectively initiated only when the balance on a previously collected account balance for the user falls below a predetermined limit.

14. The system of claim 10 wherein said account charging means maintains a record of charges incurred for a predetermined period and initiates a single electronic financial transaction to collect said charges incurred during said period after said period has elapsed.

15. An automated biometric identification and billing system for collecting usage fees upon entry of a user into a fee-for-access area, comprising:

account record storage means for storing a plurality of user account records, each record including at least (a) biometric data sufficient to identify the user and (b) designation of a collection method to be used for collecting usage fees incurred by the user;

biometric identification means connected to said account record storage means, for scanning at least one biometric feature of a person seeking entry to the access controlled area to obtain biometric feature, comparing said biometric feature information to said user account records to match said person seeking entry to a user account record, and generating a signal identifying the user account record;

account charging means connected to said biometric identification means and said account record storage means, for receiving said signal identifying the user account record, initiating a financial transaction debiting the identified user for the usage fee, and generating an access permission signal indicating that the financial transaction has been processed;

turnstile means connected to said account charging means for receiving said access permission signal and, in response to said access permission signal, permitting the user to pass through an entry point into the fee-for-access area;

cash request input means for receiving a cash dispensation request from the user;

cash request processing means connected to the cash request input means and associated with the account charging means, for receiving said cash dispensation request, initiating a financial transaction debiting the identified user for a requested amount of cash, and generating a cash dispensing actuating signal; and cash dispensing means connected to the cash request processing means for dispensing the requested amount of cash in request to said cash dispensing actuating signal; and code storage means for storing a code for permitting cash requests, where such code is provided for some but not all users;

wherein said cash dispensing means is operated only for accounts including said code for permitting cash requests.

16. An automated iris recognition boarding system for aircraft passengers, comprising:

account record storage means for storing a plurality of passenger account records in a common data repository, each record including an account number and iris recognition data sufficient to positively identify the passenger without requiring further identification;

reservation record means for receiving and storing flight reservation records in association with said account numbers, said flight reservation records including at least an identification of the flight, a seat assignment, and an association with one of said account numbers;

iris identification means connected to said account record storage means, for obtaining iris feature information sufficient to positively identify said person without the presence of other forms of identification, comparing said iris feature information to at least those stored passenger account records having an associated reservation for a flight to match said person seeking entry to said iris recognition data in a passenger account record, and generating a signal identifying a matched passenger account record and flight reservation record without requiring further identification or manipulation of tokens;

access authorization means connected to said iris identification means for receiving said access permission signal and, in response to said access permission signal, indicating that the passenger may board the aircraft.

17. The system of claim 16, further comprising at least one point of purchase iris recognition means connected to said account record storage means for performing iris recognition of a passenger having one of said passenger account records and debiting an account associated with such passenger during the sale of goods or services other than air fares.

18. The system of claim 16 wherein said account record storage means comprises a central database, with copies of passenger account records from said central database stored in a database local to at least one said iris identification means.

19. The system of claim 16 wherein said account record storage means comprises subset selection means for selecting a subset of said passenger account records for comparison by said iris identification means, said subset defining records which circumstances indicate are more likely to match said person.

20. The system of claim 16 wherein said iris identification means operates in a free run mode to acquire iris images.

21. The system of claim 16 wherein said access authorization means comprises multiple passenger boarding means for permitting a plurality of passengers to board based on a single identification of a matched passenger account record and flight reservation record.

22. The system of claim 16 wherein said passenger account records further include a PIN number which the passenger may use to authorize changes to his records.

23. The system of claim 16 further comprising a plurality of iris enrollment stations operated by individual carriers,. each connected to said account record storage means, whereby said passenger account records are stored in said common data repository to facilitate interline travel.

24. The system of claim 16 further including intermodal interface means operable with said account record storage means for permitting common carriers other than air carriers to access the passenger account records to control passenger boarding.

25. The system of claim 16 further including promotional means for automatically providing frequent traveler mileage awards as an incentive for use of the iris recognition boarding system.

26. The system of claim 16 further including promotional means for automatically providing an additional accommodation to passengers as an incentive for use of the iris recognition boarding system.

27. The system of claim 16 wherein said access authorization means comprises a turnstile.

28. The system of claim 27 wherein said turnstile is an optical turnstile.

29. A method for expedited passenger boarding onto an aircraft using iris recognition, comprising the steps of:

enrolling passengers to create a plurality of passenger account records stored in a common data repository, each including an account identifier and iris recognition data sufficient to positively identify the passenger without requiring further identification;

accepting a flight reservation from a passenger having a passenger account record, and storing a flight reservation record linked to said account identifier, said flight reservation record including a seat assignment;

imaging the iris of a person seeking entry to the aircraft to obtain iris feature information sufficient to positively identify said person without the presence of other forms of identification and tokens;

comparing said iris feature information to at least those passenger account records in the common data repository having an associated reservation for a flight to match said person seeking entry to a passenger account record, and generating a signal identifying a matched passenger account record and flight reservation record; and permitting a passenger with a matched passenger account record and flight reservation record to board the aircraft without requiring further identification or manipulation of tokens.

30. The method of claim 29, further comprising the steps of:

providing at least one point of purchase iris recognition station within a transit area;

performing iris recognition of a passenger having one of said passenger account records; and debiting an account associated with such passenger during the sale of goods or services other than air fares.

31. The method of claim 29 including the further step of transmitting copies of passenger account records from said common data repository to a database at a location where said step of imaging the iris is performed.

32. The method of claim 29 including the further step of selecting a subset of said passenger account records for use in said step of comparing said iris feature information, said subset defining records which circumstances indicate are more likely to match said person.

33. The method of claim 29 wherein said step of imaging the iris is performed using a camera in a free run mode to continually seek iris images.

34. The method of claim 29 wherein said step of accepting a flight reservation includes storing in said flight reservation record an indication that a plurality of persons will board based on a single iris recognition, and wherein said step of permitting a passenger to board the aircraft includes permitting a plurality of persons to board in conformance with said flight reservation record.

35. The method of claim 29 wherein said passenger account records further include a PIN number which the passenger may use to authorize changes to records.

36. The method of claim 29 wherein said passenger enrolling step is performed at stations operated by individual carriers, and said passenger account records are transmitted to said common data repository to facilitate interline travel.

37. The method of claim 29 comprising the further step of providing an intermodal travel interface operable with said common data repository to permit common carriers other than air carriers to access the passenger account records to control passenger boarding of their conveyances.

38. The method of claim 29 further including the step of automatically providing frequent traveler mileage awards as an incentive for use of the iris recognition boarding system.

39. The method of claim 29 further including the step of automatically providing an additional accommodation to passengers as an incentive for use of the iris recognition boarding system.

40. The method of claim 29 wherein said step of permitting a passenger to board includes passage of that passenger through a turnstile.

41. The method of claim 40 wherein said turnstile is an optical turnstile.

42. A method for expedited passenger baggage check and boarding onto an aircraft using iris recognition, comprising the steps of:

enrolling passengers to create a plurality of passenger account records, each including an account identifier and iris data sufficient to positively identify the passenger without requiring further identification;

accepting a flight reservation from a passenger having a passenger account record, and storing a flight reservation record linked to said account identifier;

providing a first iris identification station at a baggage check location and imaging an iris of a person seeking to check baggage to obtain iris feature information sufficient to positively identify said person without the presence of other forms of identification or tokens;

comparing said iris feature information obtained at said first iris identification station to at least those passenger account records having an associated reservation for a flight to match said person seeking entry to said iris data in one of said passenger account records, and when a matched passenger account record and flight reservation record are identified, tagging and receiving the person's baggage;

providing a second iris identification station at a gate location and imagine the iris of a person seeking to board the aircraft to obtain iris feature information sufficient to positively identify said person without the presence of other forms of identification or tokens;

comparing said iris feature information obtained at said second iris identification station to at least those passenger account records having an associated reservation for a flight to match said person seeking entry to said iris data in one of said passenger account records, and when a matched passenger account record and flight reservation record are identified, permitting the person to board the aircraft without requiring further identification or manipulation of tokens.

43. The method of claim 42, further comprising the steps of:

providing at least one point of purchase iris recognition station within a transit area;

performing iris recognition of a passenger having one of said passenger account records; and debiting an account associated with such passenger during the sale of goods or services other than air fares.

44. The method of claim 42 including the further step of transmitting copies of passenger account records from said common data repository to a database at a location where said step of imaging the iris is performed.

45. The method of claim 42 including the further step of selecting a subset of said passenger account records for use in said step of comparing said iris feature information, said subset defining records which circumstances indicate are more likely to match said person.

46. The method of claim 42 wherein said step of imaging the iris is performed using a camera in a free run mode to continually seek iris images.

47. The method of claim 42 wherein said step of accepting a flight reservation includes storing in said flight reservation record an indication that a plurality of persons will board based on a single iris recognition, and wherein said step of permitting a passenger to board the aircraft includes permitting a plurality of persons to board in conformance with said flight reservation record.

48. The method of claim 42 wherein said passenger account records further include a PIN number which the passenger may use to authorize changes to records.

49. The method of claim 42 wherein said passenger enrolling step is performed at stations operated by individual carriers, and said passenger account records are transmitted to said common data repository to facilitate interline travel.

50. The method of claim 42 comprising the further step of providing an intermodal travel interface operable with said common data repository to permit common carriers other than air carriers to access the passenger account records to control passenger boarding of their conveyances.

51. The method of claim 42 further including the step of automatically providing frequent traveler mileage awards as an incentive for use of the iris recognition boarding system.

52. The method of claim 42 further including the step of automatically providing an additional accommodation to passengers as an incentive for use of the iris recognition boarding system.

53. The method of claim 42 wherein said step of permitting a passenger to board includes passage of that passenger through a turnstile.

54. The method of claim 53 wherein said turnstile is an optical turnstile.

55. A method for automated aircraft passenger baggage checking, boarding, and baggage reconciliation using iris recognition, comprising the steps of:

enrolling passengers to create a plurality of passenger account records, each passenger account record including an account identifier and biometric iris data sufficient to positively identify the passenger without requiring further identification;

accepting a flight reservation from a passenger having a passenger account record, and storing a flight reservation record linked to said account identifier, said flight reservation record including a seat assignment;

providing a first iris recognition station at a baggage check location and imaging an iris of a person seeking to check baggage to obtain iris feature information sufficient to positively identify said person without the presence of other forms of identification;

comparing said iris feature information to at least those passenger account records having an associated reservation for a flight to match said person seeking entry to a passenger account record, and when a matched passenger account record and flight reservation record are identified, tagging and receiving the baggage;

providing a second iris identification station at a gate location and imagine an iris of a person seeking to board the aircraft to obtain iris feature information sufficient to positively identify said person without the presence of other forms of identification;

permitting a passenger with a matched passenger account record and flight reservation record at the second iris identification station to board the aircraft without requiring further identification; and automatically reconciling records of baggage checked at said first iris identification station with records of passenger boarding at said second iris identification, station to identify baggage which was checked but whose owner did not board the aircraft, so that such baggage does not go with the aircraft.

56. The method of claim 55, further comprising the steps of:

providing at least one point of purchase iris recognition station within a transit area;

performing iris recognition of a passenger having one of said passenger account records; and debiting an account associated with such passenger during the sale of goods or services other than air fares.

57. The method of claim 55 including the further step of transmitting copies of passenger account records from said common data repository to a database at a location where said step of imaging the iris is performed.

58. The method of claim 55 including the further step of selecting a subset of said passenger account records for use in said step of comparing said iris feature information, said subset defining records which circumstances indicate are more likely to match said person.

59. The method of claim 55 wherein said step of imaging the iris is performed using a camera in a free run mode to continually seek iris images.

60. The method of claim 55 wherein said step of accepting a flight reservation includes storing in said flight reservation record an indication that a plurality of persons will board based on a single iris recognition, and wherein said step of permitting a passenger to board the aircraft includes permitting a plurality of persons to board in conformance with said flight reservation record.

61. The method of claim 55 wherein said passenger account records further include a PIN number which the passenger may use to authorize changes to records.

62. The method of claim 55 wherein said passenger enrolling step is performed at stations operated by individual carriers, and said passenger account records are transmitted to said common data repository to facilitate interline travel.

63. The method of claim 55 comprising the further step of providing an intermodal travel interface operable with said common data repository to permit common carriers other than air carriers to access the passenger account records to control passenger boarding of their conveyances.

64. The method of claim 55 further including the step of automatically providing frequent traveler mileage awards as an incentive for use of the iris recognition boarding system.

65. The method of claim 55 further including the step of automatically providing an additional accommodation to passengers as an incentive for use of the iris recognition boarding system.

66. The method of claim 55 wherein said step of permitting a passenger to board includes passage of that passenger through a turnstile.

67. The method of claim 66 wherein said turnstile is an optical turnstile.

* * * * *